United States Patent
Fujii et al.

(10) Patent No.: US 10,766,274 B2
(45) Date of Patent: Sep. 8, 2020

(54) PRINTER, PRINTER-EQUIPPED IMAGING APPARATUS, AND PRINTING CONTROL METHOD

(71) Applicant: FUJIFILM Corporation, Tokyo (JP)

(72) Inventors: Takeshi Fujii, Tokyo (JP); Hirofumi Katsura, Tokyo (JP); Hiroyuki Uchiyama, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 11 days.

(21) Appl. No.: 16/196,141

(22) Filed: Nov. 20, 2018

(65) Prior Publication Data
US 2019/0084317 A1 Mar. 21, 2019

Related U.S. Application Data

(63) Continuation of application No. PCT/JP2017/015060, filed on Apr. 13, 2017.

(30) Foreign Application Priority Data

Jul. 7, 2016 (JP) ................. 2016-135044

(51) Int. Cl.
*B41J 2/47* (2006.01)
*B41J 2/45* (2006.01)
(Continued)

(52) U.S. Cl.
CPC ............... *B41J 2/47* (2013.01); *B41J 2/447* (2013.01); *B41J 2/45* (2013.01); *G03B 17/52* (2013.01);
(Continued)

(58) Field of Classification Search
CPC ..... B41J 2/47; B41J 2/45; B41J 2/447; G03B 27/00; G03B 17/52; G03B 27/72; G03D 5/06
See application file for complete search history.

(56) References Cited

U.S. PATENT DOCUMENTS 6,963,359 B1 * 11/2005 Aosaki ............... G03B 17/52
348/207.2
2001/0033744 A1 * 10/2001 Ohmura ............... G03B 17/52
396/30
(Continued)

FOREIGN PATENT DOCUMENTS

JP H05-332788 A 12/1993
JP H10-337904 A 12/1998
(Continued)

OTHER PUBLICATIONS

International Search Report issued in PCT/JP2017/015060; dated Jul. 18, 2017.
(Continued)

*Primary Examiner* — Scott A Richmond
(74) *Attorney, Agent, or Firm* — Studebaker & Brackett PC

(57) ABSTRACT

A pulse signal is detected from an encoder signal of a rotary encoder. The detected pulse signal is used as a signal for controlling a light exposure timing of a line type light exposure head and is used for detecting a transport speed of an instant film. The light exposure head sequentially performs light exposure for a line image on the transported instant film in synchronization with each pulse signal detected from the encoder signal, and a density correction unit corrects an amount of light emission of the light exposure head depending on the transport speed of the instant film.

20 Claims, 19 Drawing Sheets

(51) Int. Cl.
    *G03B 27/00*     (2006.01)
    *G03D 5/06*     (2006.01)
    *G03B 17/52*     (2006.01)
    *B41J 2/447*     (2006.01)
    *G03B 27/72*     (2006.01)

(52) U.S. Cl.
    CPC ............. *G03B 27/00* (2013.01); *G03B 27/72* (2013.01); *G03D 5/06* (2013.01)

(56) References Cited

U.S. PATENT DOCUMENTS

2001/0055983 A1* 12/2001 Ohmura .................. H04M 1/22
                                                                                         455/566
2002/0097383 A1   7/2002 Futakami et al.
2005/0263026 A1  12/2005 Aosaki et al.

FOREIGN PATENT DOCUMENTS

| JP | H11-344772 A | 12/1999 |
| --- | --- | --- |
| JP | H11-352610 A | 12/1999 |
| JP | 2000-305191 A | 11/2000 |
| JP | 2001-296643 A | 10/2001 |
| JP | 2002-219824 A | 8/2002 |

OTHER PUBLICATIONS

International Preliminary Report on Patentability and Written Opinion issued in PCT/JP2017/015060; dated Jan. 8, 2019.
Extended European Search Report issued in EP 17823831.7-1019 by the European Patent Office dated May 31, 2019, which is related to U.S. Appl. No. 16/196,141.

\* cited by examiner

PRINTER, PRINTER-EQUIPPED IMAGING APPARATUS, AND PRINTING CONTROL METHOD

CROSS-REFERENCE TO RELATED APPLICATIONS

This application is a Continuation of PCT International Application No. PCT/JP2017/015060 filed on Apr. 13, 2017, which claims priority under 35 U.S.C. § 119(a) to Japanese Patent Application No. 2016-135044 filed on Jul. 7, 2016. Each of the above application(s) is hereby expressly incorporated by reference, in its entirety, into the present application.

BACKGROUND OF THE INVENTION

1. Field of the Invention

The present invention relates to a printer, a printer-equipped imaging apparatus, and a printing control method and particularly, to a technology for printing a high image quality photographic print.

2. Description of the Related Art

An instant film configured with a light exposure surface side photosensitive sheet that is photosensitive to three primary colors (red, green, and blue) incident thereon, an observation surface side cover sheet that is on the opposite side from the light exposure surface, a developing treatment liquid pod that is disposed at one end (distal end) of the instant film and contains a developing treatment liquid, and a trap portion that is disposed at the other end (proximal end) of the instant film and collects the remaining developing treatment liquid is known as a photosensitive instant film. A plurality of non-used instant films is accommodated in an instant film pack.

Such a type of instant film pack is used in an optical camera or an optical printer.

In the related art, a printer that transports the instant film at a constant speed and exposes the instant film to light using a line type fixed light exposure head is known as a printer using the instant film (JP2001-296643A).

A transport device for the instant film of the printer disclosed in JP2001-296643A includes a claw member, a capstan roller, and spread roller and is configured with a driving mechanism causing the claw member to reciprocate in a transport direction of the instant film and a driving mechanism rotating the capstan roller and the spread roller with one direct-current (DC) motor as a driving source.

The instant film is withdrawn from the instant film pack loaded in the printer by moving the claw member in a discharge direction of the instant film. The withdrawn instant film is passed to a transport unit by the capstan roller and a pinch roller and is transported at a constant speed. A pair of spread rollers arranged on a downstream side of the capstan roller breaks the developing treatment liquid pod of the instant film, spreads the developing treatment liquid from the developing treatment liquid pod between the photosensitive sheet and the cover sheet, and causes the remaining developing treatment liquid to be collected by the trap portion.

The printer disclosed in JP2001-296643A includes a reference frequency generation circuit that generates a reference frequency as a light exposure timing of the light exposure head, and a rotary encoder of which a rotating slit plate is fixed to a shaft of the capstan roller. The reference frequency from the reference frequency generation circuit and the frequency of an encoded pulse acquired from the rotary encoder are compared with each other. The DC motor is subjected to feedback control such that the rotational speed of the DC motor is set to a constant speed, and the transport speed of the instant film is stabilized.

In addition, at the same time as the control of the transport speed of the instant film, the printer disclosed in JP2001-296643A controls the amount of light emission of the light exposure head in accordance with the rotational speed of the capstan roller in order to perform clear printing without color unevenness. For example, in a case where the rotational speed of the capstan roller (the transport speed of the instant film) is high, correction is performed such that a light emission intensity is increased, or a light emission time period is increased in correspondence with the transport speed. In a case where the rotational speed of the capstan roller is low, correction is performed such that the light emission intensity is decreased, or the light emission time period is decreased in correspondence with the transport speed.

SUMMARY OF THE INVENTION

The printer disclosed in JP2001-296643A performs high accuracy speed control using an output signal of the rotary encoder in control (feedback control) of the transport speed of the instant film. That is, the speed of the DC motor is controlled such that the transport speed of the instant film (the pulse frequency of an encoder signal of the rotary encoder) corresponds to the reference frequency generated from the reference frequency generation circuit.

The reference frequency generated from the reference frequency generation circuit is used as the light exposure timing of the light exposure head.

Accordingly, the instant film is transported at a constant transport speed, and the light exposure head is driven using the reference frequency generated from the reference frequency generation circuit. Thus, a favorable photographic print that does not have unevenness is acquired. However, in this case, the cost of the transport device for the instant film is increased.

In addition, in JP2001-296643A, while correction of the light emission intensity or the light emission time period of the light exposure head depending on the rotational speed of the capstan roller (the transport speed of the instant film) is disclosed, correction of the light emission intensity or the light emission time period of the light exposure head depending on a change in speed of the transport speed of the instant film is not disclosed, and the light exposure timing at which the light emission intensity or the light emission time period is to be corrected is not disclosed.

The present invention is conceived in view of such matters. An object of the present invention is to provide a printer, a printer-equipped imaging apparatus, and a printing control method that can use an inexpensive device as a film transport device transporting an instant film and can print a high image quality photographic print that does not have unevenness having a shape of streaks.

In order to achieve the above object, a printer according to one aspect of the present invention comprises an image data input unit that inputs image data, a line type light exposure head that is driven based on the input image data, a film transport device including a capstan roller and a pinch roller that transport an instant film having a pod portion containing a developing treatment liquid in a direction orthogonal to a longitudinal direction of the light exposure head, a pair of spread rollers that are arranged downstream of the capstan roller and the pinch roller in a transport direction of the instant film and spread the developing treatment liquid of the pod portion by squeezing the pod portion of the instant film and forwarding the instant film with pressure, and a power transmission mechanism that transmits rotational driving power of an electric motor to each of the capstan roller and the spread rollers, a rotary encoder that outputs an encoder signal including a pulse signal having a cycle corresponding to a rotational speed of the capstan roller, a pulse signal detection unit that detects the pulse signal from the encoder signal output from the rotary encoder, a control unit that controls the light exposure head based on the image data input from the image data input unit, includes a speed detection unit detecting a transport speed of the instant film based on the pulse signal detected by the pulse signal detection unit, controls a light exposure timing of the light exposure head for a line image corresponding to the image data in synchronization with the pulse signal detected by the pulse signal detection unit, and sets the number of the line images per unit forwarding length of the instant film to be constant regardless of the transport speed of the instant film, and a density correction unit that corrects an amount of light emission of the light exposure head based on the transport speed of the instant film detected by the speed detection unit and corrects a change in density of the line image caused by a change in the transport speed of the instant film.

The instant film used in the printer according to the present invention has a significant change in transport load during transport of the instant film. For example, the load is increased when a distal end of the instant film enters between the capstan roller and the pinch roller, and when the developing treatment liquid flows out from the pod portion by breaking the pod portion of the instant film using the pair of spread rollers. Accordingly, in the case of an inexpensive film transport device, the transport speed of the instant film is changed by the transport load.

According to one aspect of the present invention, the light exposure timing of the light exposure head for the line image is controlled in synchronization with the pulse signal detected from the encoder signal (output signal) of the rotary encoder. Thus, the number of the line images per unit forwarding length of the instant film can be set to be constant regardless of the transport speed of the instant film. Accordingly, the film transport device used in the printer does not need to transport the instant film at a constant transport speed, and an inexpensive device (an inexpensive film transport device that does not perform a speed control such as speed feedback) can be applied.

In a case where the transport speed of the instant film changes, unevenness having a shape of streaks occurs in a part where the transport speed is changed. However, since the amount of light emission of the light exposure head is corrected based on the transport speed of the instant film, a change in the density of the line image caused by a change in the transport speed of the instant film can be corrected (a high image quality photographic print can be printed without unevenness having a shape of streaks).

In the printer according to another aspect of the present invention, the electric motor is a direct current motor, and the film transport device supplies a constant voltage to the direct current motor from a direct current power supply. Accordingly, even in a case where the transport speed is changed by the transport load during transport of the instant film, an inexpensive device that does not perform a speed control of the direct current motor can be applied as the film transport device, and the cost of the printer can be reduced.

In the printer according to still another aspect of the present invention, it is preferable that the speed detection unit detects the transport speed of the instant film based on a cycle of the pulse signal acquired from a plurality of the pulse signals that are detected by the pulse signal detection unit before the light exposure timing of the light exposure head for the line image.

In the printer according to still another aspect of the present invention, it is preferable that the plurality of pulse signals before the light exposure timing are three or more pulse signals, and the cycle of the pulse signal is a cycle of an average of two or more cycles acquired from the three or more pulse signals.

In the printer according to still another aspect of the present invention, it is preferable that based on the transport speed of the instant film detected by the speed detection unit, the density correction unit decreases the amount of light emission emitted from the light exposure head as the transport speed of the instant film is decreased, and increases the amount of light emission emitted from the light exposure head as the transport speed of the instant film is increased.

In the printer according to still another aspect of the present invention, it is preferable that the control unit controls the amount of light emission emitted from the light exposure head based on the input image data by performing pulse width modulation of the pulse signal, and the density correction unit corrects a pulse width of the pulse width modulated pulse signal based on the transport speed of the instant film detected by the speed detection unit.

It is preferable that the printer according to still another aspect of the present invention further comprises an effective detection period setting unit that sets an effective detection period for detecting a subsequent pulse signal each time the pulse signal detection unit detects the pulse signal, and a pulse signal generation unit that generates the pulse signal after the effective detection period in a case where the pulse signal detection unit does not detect the pulse signal within the effective detection period, in which the pulse signal detection unit detects the pulse signal from the encoder signal only within the effective detection period, and the control unit controls the light exposure timing of the light exposure head for the line image in synchronization with the pulse signal detected by the pulse signal detection unit and the pulse signal generated by the pulse signal generation unit.

According to still another aspect of the present invention, the effective detection period for detecting the subsequent pulse signal is set, each time the pulse signal is detected from the input encoder signal. Accordingly, even in a case where a noise signal is mixed in a period other than the effective detection period, the noise signal is not erroneously detected, and the noise signal can be removed. In a case where the line head is driven in synchronization with the pulse signal and the noise signal, white streaks accompanied by mixing of the noise signal occur in the photographic print. However, by removing the noise signal, the occurrence of white streaks can be prevented. In addition, in a case where the pulse signal is not detected from the encoder signal within the effective detection period, the pulse signal is generated after the effective detection period. Thus, even in a case where the original pulse signal is lost from the encoder signal, the lost pulse signal can be supplemented. In a case where the pulse signal is lost, black streaks occur in the photographic print. However, since the pulse signal is generated in a case where the pulse signal is lost, black streaks can be removed.

In the printer according to still another aspect of the present invention, it is preferable that the effective detection period setting unit sets the effective detection period based on a cycle of a plurality of the pulse signals detected by the pulse signal detection unit before the light exposure timing of the light exposure head for the line image and a width of change in the transport speed of the instant film.

In the printer according to still another aspect of the present invention, it is preferable that the pulse signal generation unit detects only initial one pulse signal within the effective detection period. In a case where the noise signal is mixed in the effective detection period, two or more pulse signals may be detected. In this case, only the initial one pulse signal is detected. While a case where the initial one pulse signal is the noise signal is considered, the noise signal in this case and the original pulse signal has a difference within the width of change in transport speed. Thus, problems are not caused in a process in a subsequent stage.

It is preferable that the printer according to still another aspect of the present invention further comprises a delay circuit that outputs the pulse signal detected by the pulse signal detection unit by delaying the pulse signal by a certain time period. The reason is that in a case where the pulse signal is generated after the effective detection period, the generated pulse signal and the pulse signal to be detected by the pulse signal detection unit are not significantly shifted from each other.

In the printer according to still another aspect of the present invention, it is preferable that the certain time period is a time period that corresponds to the effective detection period.

A printer-equipped imaging apparatus according to still another aspect of the present invention comprises the printer, and an imaging unit that functions as the image data input unit.

According to still another aspect of the invention, a printing control method for a printer including a line type light exposure head that is driven based on image data, a capstan roller and a pinch roller that transport an instant film having a pod portion containing a developing treatment liquid in a direction orthogonal to a longitudinal direction of the light exposure head, a pair of spread rollers that are arranged downstream of the capstan roller and the pinch roller in a transport direction of the instant film and spread the developing treatment liquid of the pod portion by squeezing the pod portion of the instant film and forwarding the instant film with pressure, a power transmission mechanism that transmits rotational driving power of an electric motor to each of the capstan roller and the spread rollers, a rotary encoder that outputs an encoder signal including a pulse signal having a cycle corresponding to a rotational speed of the capstan roller, a pulse signal detection unit that detects the pulse signal from the encoder signal output from the rotary encoder, and a speed detection unit that detects a transport speed of the instant film based on the pulse signal detected by the pulse signal detection unit, and controlling a light exposure timing of the light exposure head for a line image corresponding to the image data in synchronization with the detected pulse signal and setting the number of the line images per unit forwarding length of the instant film to be constant regardless of the transport speed of the instant film comprises a step of detecting the pulse signal by the pulse signal detection unit, a step of detecting the transport speed of the instant film by the speed detection unit, and a step of correcting an amount of light emission of the light exposure head based on the transport speed of the instant film detected by the speed detection unit and correcting a change in density of the line image caused by a change in the transport speed of the instant film.

According to the present invention, an inexpensive device can be used as the film transport device transporting the instant film, and a high image quality photographic print can be printed without unevenness having a shape of streaks.

DESCRIPTION OF THE PREFERRED EMBODIMENTS

Hereinafter, embodiments of a printer, a printer-equipped imaging apparatus, and a printing control method according to the present invention will be described with reference to the appended drawings.

[Printer]

Figure 1:
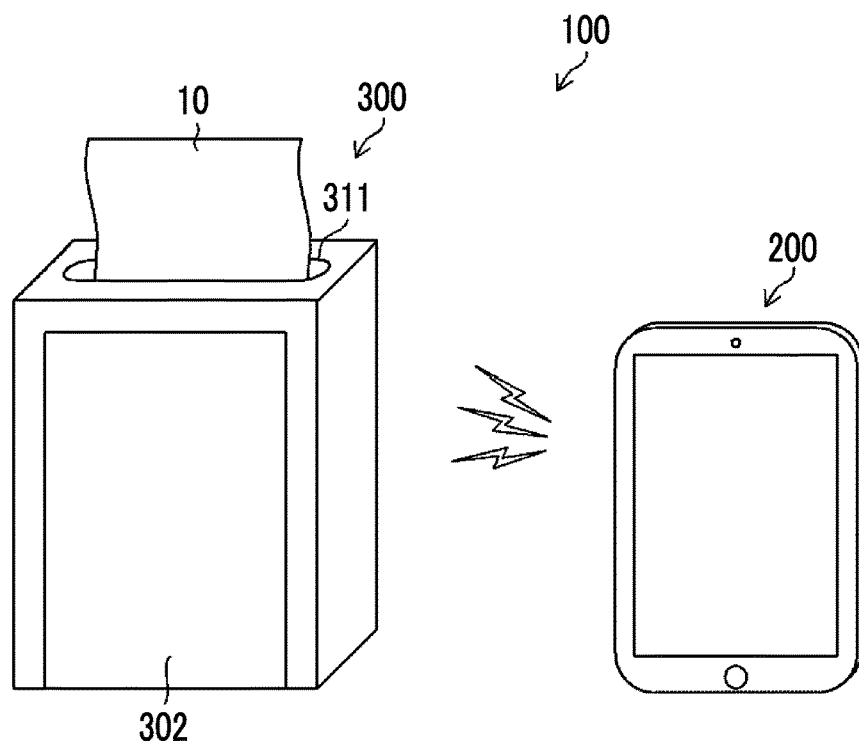
FIG. 1 is an exterior view illustrating a configuration of a printing system including a printer according to an embodiment of the present invention.

FIG. 1 is an exterior view illustrating a configuration of a printing system including the printer according to an embodiment of the present invention. A printing system 100 illustrated in FIG. 1 is configured with a smartphone 200 and a printer 300.

The smartphone 200 comprises a capturing optical system and a wireless communication unit, not illustrated, and transmits image data of an image captured through the capturing optical system by a user and a printing instruction for the image data to the printer 300 through the wireless communication unit. At this point, data of a so-called template (text, numbers, symbols, illustrations, and the like) may also be transmitted together and may be printed along with the image. A smartphone that is generally used can be used as the smartphone 200, provided that the smartphone is of a type that can perform capturing and wireless communication. Management and transmission of data such as the image data, the printing instruction, and the template may be performed by installing a dedicated application on the smartphone 200.

The printer 300 can perform wireless communication and performs printing on an instant film 10, described below, as a printing medium through a wireless communication unit 75 (refer to FIG. 9; image data input unit) using the image data, the template (in a case where the template is transmitted from the smartphone 200), and the printing instruction received from the smartphone 200. The instant film 10 after printing is discharged from a film discharge port 311 that is disposed in an end portion of the printer 300. The printer 300 comprises an operation unit and a display unit, not illustrated.

A device that transmits the image data to the printer 300 is not limited to the smartphone 200 and may be a digital camera, a portable information terminal, a tablet terminal, or the like that has a wireless communication function. In addition, the printer 300 is not limited to the case of receiving the image data by wireless communication and may receive the image data through a recording medium such as a communication cable or a memory card.

<Loading of Instant Film Pack>

Figure 2:
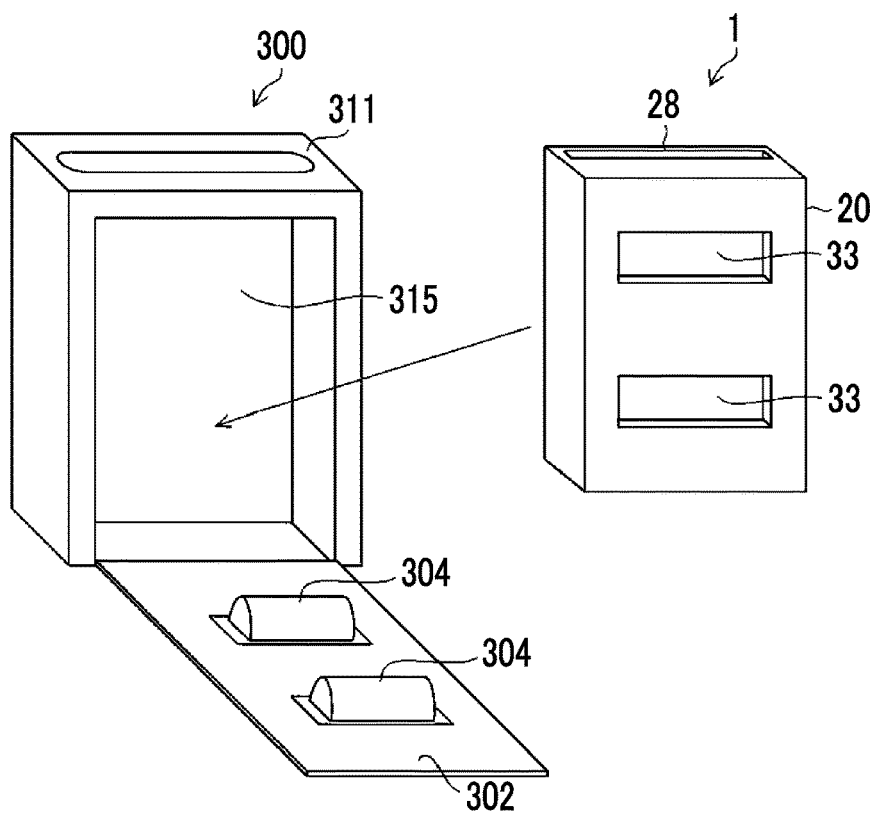
FIG. 2 is a view illustrating a state where an instant film pack is loaded into the printer.

FIG. 2 is a view illustrating a state where an instant film pack 1 is loaded into the printer 300. A loading chamber 315 is disposed in the printer 300. The instant film pack 1 is loaded into the loading chamber 315. A lid member 302 that is openable and closable is disposed in the loading chamber 315. The user closes the lid member 302 after loading the instant film pack 1. An uplifting member 304 that is biased by a spring, not illustrated, is disposed in the lid member 302. In a case where the lid member 302 is closed after the instant film pack 1 is loaded into the loading chamber 315, the uplifting member 304 is inserted into an uplifting member insertion part 33 disposed on the rear surface of the instant film pack 1 and uplifts a light shielding sheet 50 (refer to FIG. 3) to a front surface side (an opposite side of the uplifting member insertion part 33 from an opening surface), and the instant film 10 is pressed to an inner surface of a case 20.

<Configuration of Instant Film Pack>

Figure 3:
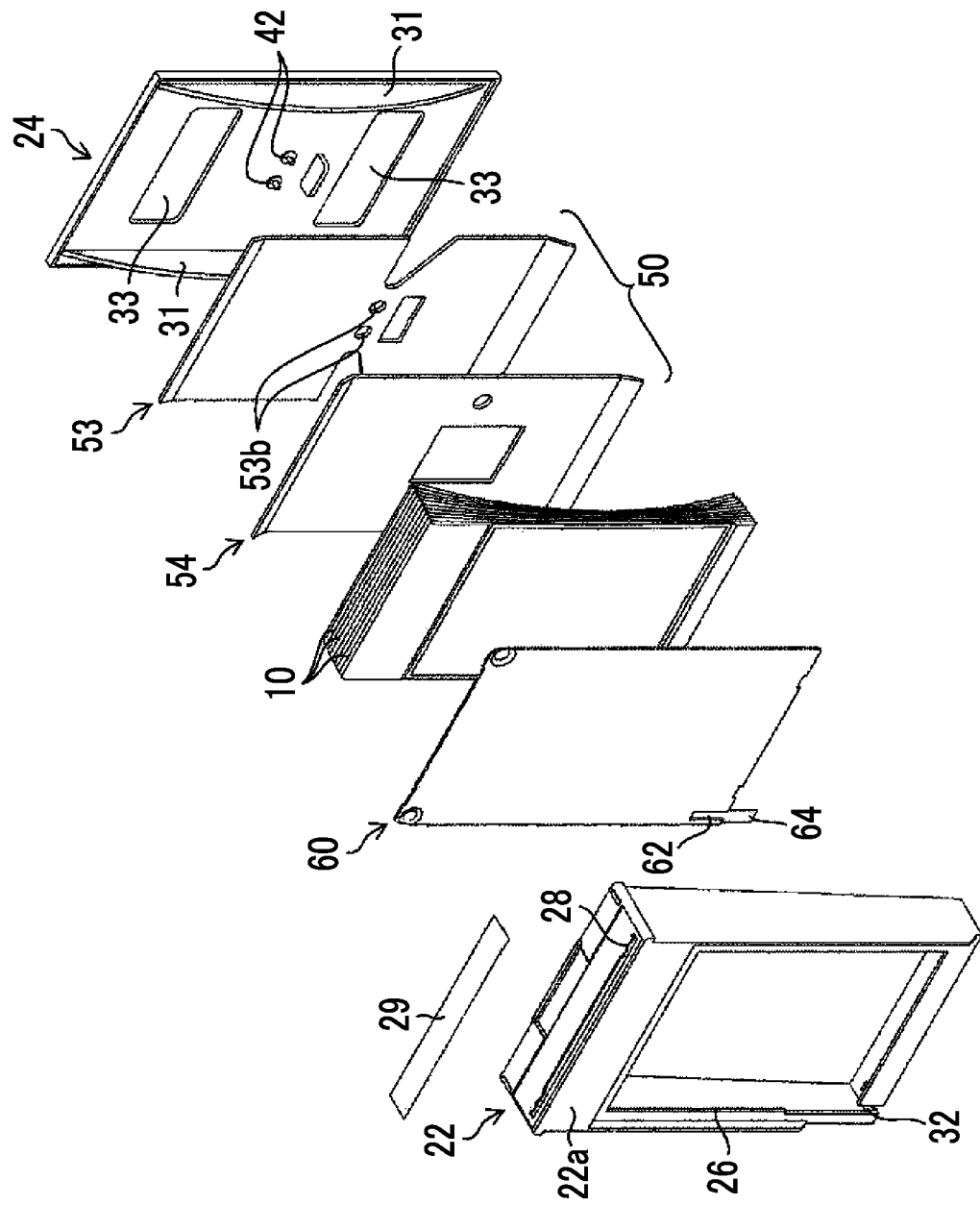
FIG. 3 is an exploded perspective view of the instant film pack.

FIG. 3 is an exploded perspective view of the instant film pack 1. The instant film pack 1 is configured to comprise the instant film 10, the case 20 (refer to FIG. 2) that accommodates the instant film 10, the light shielding sheet 50, and a film cover 60. The case 20 is configured with a case main body 22 and a case lid 24 that covers the rear surface of the case main body 22.

<Case Main Body>

The case main body 22 has a flat box shape of which a rear surface portion is open. The case main body 22 comprises a light exposure opening portion 26 for exposing a light exposure area of the instant film 10, a discharge port 28 for discharging the instant film 10, a case flap material 29 for shielding the discharge port 28 from light, and a claw opening portion 32 for inserting a claw member 72 (refer to FIG. 9 to FIG. 12). The light exposure opening portion 26 has a shape that corresponds to the shape of a light exposure portion 12 (refer to FIG. 4) of the instant film 10. The light exposure opening portion 26 is arranged at a position where the light exposure portion 12 of the instant film 10 accommodated in the case 20 is exposed.

The discharge port 28 is disposed in a top surface portion of the case main body 22 and has a slit shape of a size through which the instant film 10 can pass. The discharge port 28 is arranged at a position where the instant film 10 that is positioned in the uppermost part in a stack direction can be discharged.

The case flap material 29 is configured with a film piece having a rectangular shape and blocks the discharge port 28 in an openable and closable manner by bonding the case flap material 29 to the case main body 22 along a long edge on one side.

Figure 6:
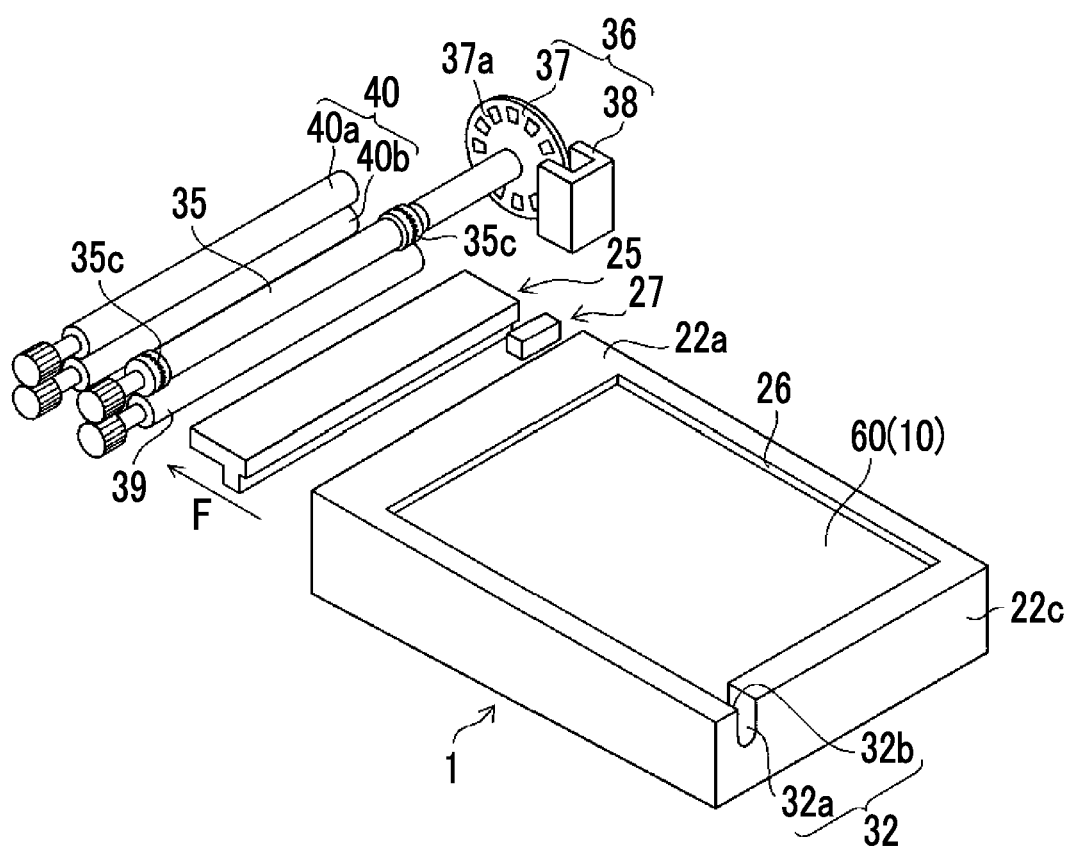
FIG. 6 is a perspective view illustrating a transport mechanism for the instant film and a film cover.

A front surface part 22a and a bottom surface portion 22c of the case main body 22 comprise the claw opening portion 32 as illustrated in FIG. 6. The claw opening portion 32 has a slit shape and is linearly arranged in the front surface part 22a with the bottom surface portion 22c as a start point. The bottom surface portion 22c of the case main body 22 comprises an entrance portion 32a that has a notch shape and constitutes a part of the claw opening portion 32 as illustrated in FIG. 6. The front surface part 22a of the case main body 22 comprises a passage portion 32b that has a slit shape and constitutes a part of the claw opening portion 32. The passage portion 32b is linearly arranged in a transport direction F of the instant film 10. The end point of the passage portion 32b is the light exposure opening portion 26. That is, the claw opening portion 32 is arranged in a form of linearly connecting the bottom surface portion 22c and the light exposure opening portion 26 of the case main body 22. The width of the claw opening portion 32 is set to a width through which the claw member 72 can be inserted.

<Case Lid>

The case lid 24 has a rectangular plate shape and is mounted on the rear surface portion of the case main body 22 to cover the open rear surface of the case main body 22. The case lid 24 comprises a pair of uplifting member insertion parts 33, a pair of film support units 31, and a pair of light shielding sheet attaching units 42. The uplifting member insertion parts 33 are opening portions for inserting the uplifting member 304 (refer to FIG. 2). The film support units 31 are support units that support the instant film pack 1 accommodated in the case 20. The film support units 31 are configured with thin plates having an arc shape and are arranged inside the case lid 24 along the long edges of the case lid 24 on both sides. The instant film 10 accommodated in the case 20 is supported in a convex shape by the film support units 31. The light shielding sheet attaching units 42 are attaching units for the light shielding sheet 50. The light shielding sheet attaching units 42 are configured with pins having a cylindrical shape and are arranged in parallel in a central part of the case lid 24.

<Light Shielding Sheet>

The light shielding sheet 50 supports the instant film 10 and shields the instant film 10 from light in the case 20. The light shielding sheet 50 is configured by combining a first light shielding sheet 53 functioning as a plate spring and a second light shielding sheet 54 functioning as a support plate. The light shielding sheet 50 into which the first light shielding sheet 53 and the second light shielding sheet 54 are integrated is attached to the case lid 24 by fitting a fixed portion 53b of the first light shielding sheet 53 with the light shielding sheet attaching units 42 of the case lid 24 and bonding the fitted part. The light shielding sheet 50 attached to the case lid 24 is arranged between the pair of film support units 31.

As described above, in a case where the lid member 302 is closed after the instant film pack 1 is loaded into the loading chamber 315, the uplifting member 304 is inserted into the uplifting member insertion parts 33. The light shielding sheet 50 is pressed by the uplifting member 304 inserted into the uplifting member insertion parts 33, and the instant film 10 is pressed to the inner surface of the case 20. At this point, the first light shielding sheet 53 elastically deforms and elastically presses the instant film 10 to the inner surface of the case 20.

<Film Cover>

The film cover 60 shields light from the light exposure opening portion 26. As illustrated in FIG. 3, the film cover 60 is accommodated in the case 20 such that the film cover 60 is arranged in an overlapping manner with the uppermost part of the stacked instant film 10. The film cover 60 comprises a notch portion 62 and a film cover skirt material 64. The notch portion 62 has a slit shape and is comprised in a proximal end portion of the film cover 60. The notch portion 62 is arranged in a feed direction of the film cover 60. A position at which the notch portion 62 is arranged is set to the same position as the claw opening portion 32. Accordingly, in a case where the film cover 60 is accommodated in the case 20, the notch portion 62 is arranged such that the notch portion 62 leads to the claw opening portion 32. The notch portion 62 has the same width as the claw opening portion 32. The "same width" includes almost the same width.

The film cover skirt material 64 is one example of a light shielding member and is attached to the film cover 60 to shield light from the claw opening portion 32 and the notch portion 62. The film cover skirt material 64 is configured with a sheet piece having a rectangular shape. The film cover skirt material 64 is attached to a rear surface portion of the film cover 60 and blocks the notch portion 62. At this point, a part of the film cover skirt material 64 is attached such that the part protrudes from the film cover 60. The protruding part functions as a skirt portion for blocking the entrance portion 32a of the claw opening portion 32. In a case where the film cover 60 is accommodated in the case 20, the entrance portion 32a of the claw opening portion 32 is blocked by the skirt portion, and light from the entrance portion 32a is shielded.

The film cover skirt material 64 is attached to the film cover 60 by bonding. In addition, the film cover 60 mounted on the case 20 is fixed by bonding the skirt portion of the film cover skirt material 64 to the inner surface of the case 20. In a case where the claw member 72 starts transporting the film cover 60, the film cover skirt material 64 moves along with the film cover 60 and is discharged from the discharge port 28.

<Instant Film>

Figure 4:
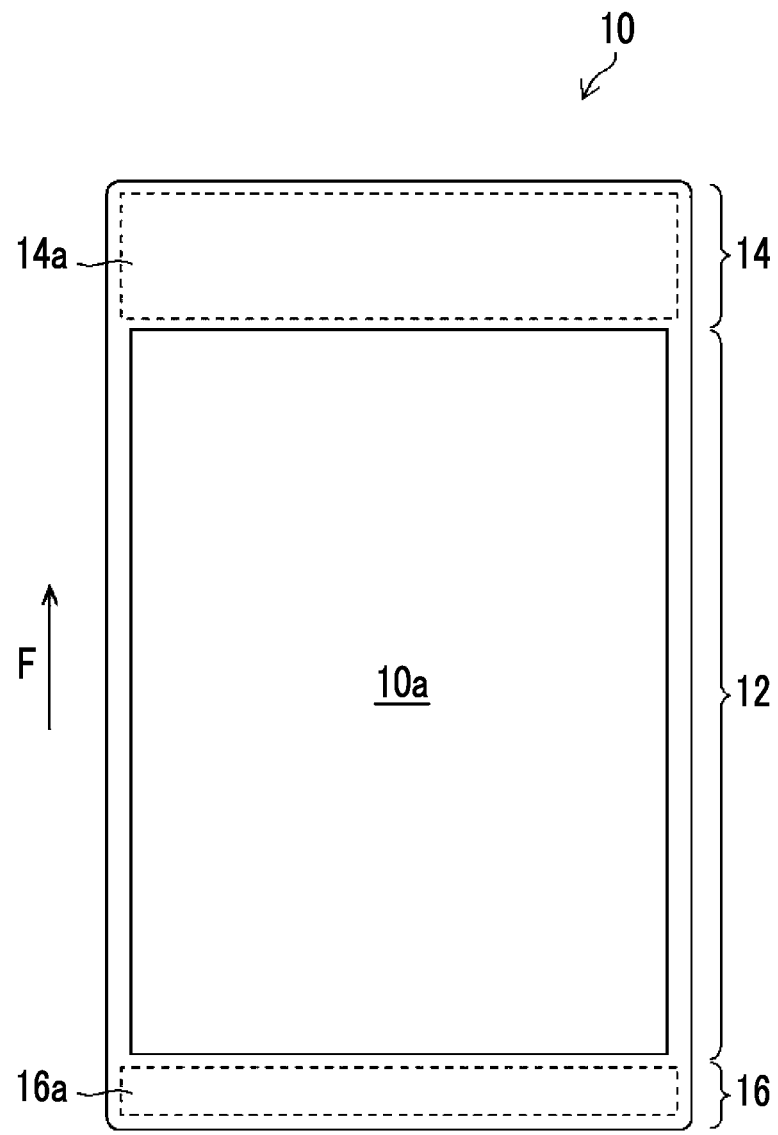
FIG. 4 is a plan view of an instant film seen from a light exposure surface side.
Figure 5:
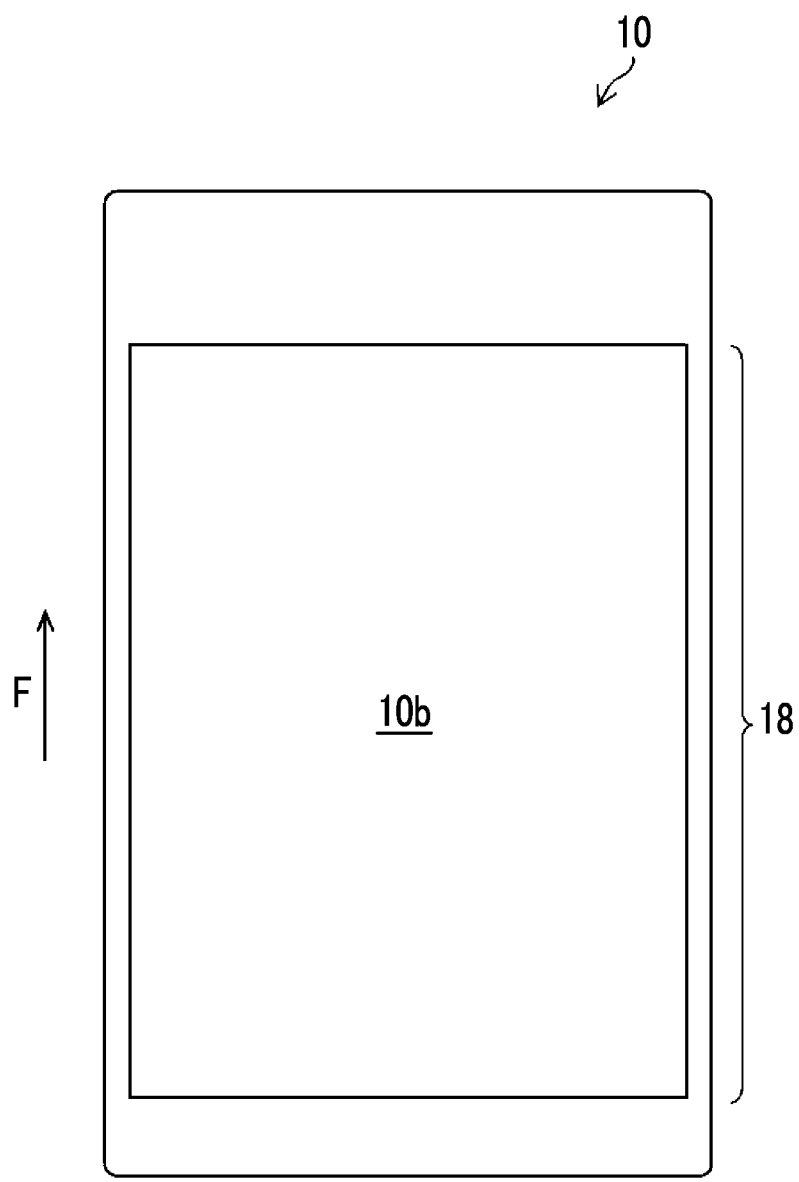
FIG. 5 is a plan view of the instant film seen from an observation surface side.

The instant film 10 is a well-known self-developing type instant film and has a rectangular card shape. As illustrated in FIG. 4 and FIG. 5, the instant film 10 is configured such that a surface on one side is a light exposure surface (photosensitive sheet) 10a, and a surface on the other side is an observation surface (cover sheet) 10b. The instant film 10 in the present example is a positive photosensitizer such that the density of each of red, green, and blue is increased as the amount of incident light of three primary colors (red, green, and blue) is increased.

FIG. 4 is a plan view of the instant film seen from the light exposure surface 10a side. In the drawing, a direction that is indicated using an arrow is a feed direction (transport direction F) of the instant film 10. The feed direction means a direction in which the instant film 10 is used. In a case where the instant film 10 is accommodated in the case 20, the feed direction of the instant film 10 is a discharge direction of the instant film 10. The light exposure surface 10a comprises the light exposure portion 12, a pod portion 14, and a trap portion 16. The light exposure portion 12 is a light exposure area and is arranged between the pod portion 14 and the trap portion 16 as an area having a rectangular shape. The pod portion 14 is arranged on a distal end side in the feed direction of the instant film 10. The pod portion 14 incorporates a developing treatment liquid pod 14a that contains a developing treatment liquid. The trap portion 16 is arranged on a proximal end side in the feed direction of the instant film 10. The trap portion 16 incorporates an absorbing material 16a.

FIG. 5 is a plan view of the instant film seen from the observation surface 10b side. In FIG. 5, a direction that is indicated using an arrow is the feed direction (transport direction F) of the instant film 10. The observation surface 10b comprises an observation portion 18 that is an observation area of the captured image. The observation portion 18 is arranged in correspondence with the light exposure portion 12 on the light exposure surface side.

The instant film 10 is subjected to a developing treatment by spreading the developing treatment liquid in the pod portion 14 to the light exposure portion 12 after light exposure. By passing the instant film 10 between a pair of spread rollers 40 (refer to FIG. 6 to FIG. 8), the developing treatment liquid in the pod portion 14 is squeezed and is spread to the light exposure portion 12. At this point, the remaining developing treatment liquid is trapped by the trap portion 16.

<Assembly of Instant Film Pack>

The instant film pack 1 is assembled by accommodating the film cover 60 and the instant film 10 in the case main body 22 and closing the rear surface of the case main body 22 with the case lid 24. At this point, first, the film cover 60 is accommodated in the case main body 22. The skirt portion of the film cover skirt material 64 is bonded to the inner surface of the case 20. Accordingly, the light exposure opening portion 26 and the claw opening portion 32 are blocked by the film cover 60. Then, the instant film 10 is accommodated in the case main body 22 in a state where the instant film 10 is stacked. The instant film 10 is stacked with the light exposure surface 10a (refer to FIG. 4) as the top of the instant film 10. The instant film 10 is accommodated in the case main body 22 such that the light exposure surface 10a is directed toward the light exposure opening portion 26 side. Accordingly, the film cover 60 and the instant film 10 are accommodated in the case main body 22 in a state where the film cover 60 is placed on the light exposure surface 10a of the instant film 10 positioned in the uppermost part. Then, the rear surface of the case main body 22 is closed with the case lid 24 to which the light shielding sheet 50 is attached. Accordingly, the assembly of the instant film pack 1 is completed.

<Manner of Using Instant Film Pack>

The instant film pack 1 can be used in both manners of using the instant film pack 1 by detaching the film cover 60 and using the instant film pack 1 without detaching the film cover 60. In the printer 300 of the present embodiment, the instant film pack 1 is loaded into the printer 300 and then, is used by detaching (discharging) the film cover 60. In this case, the instant film 10 is exposed to light by the light exposure head 25 (refer to FIG. 6 and FIG. 7) after being transported from the case 20, and printing is performed by spreading the developer using the spread rollers 40 (refer to FIG. 6 and FIG. 7). The transport and light exposure (printing) are sequentially performed from the instant film 10 positioned in the uppermost part in the case to the instant film 10 positioned in a lower part. The transport, discharge, and light exposure for the film cover 60 and the instant film 10 will be described below.

<Main Configuration of Printer>

Figure 7:
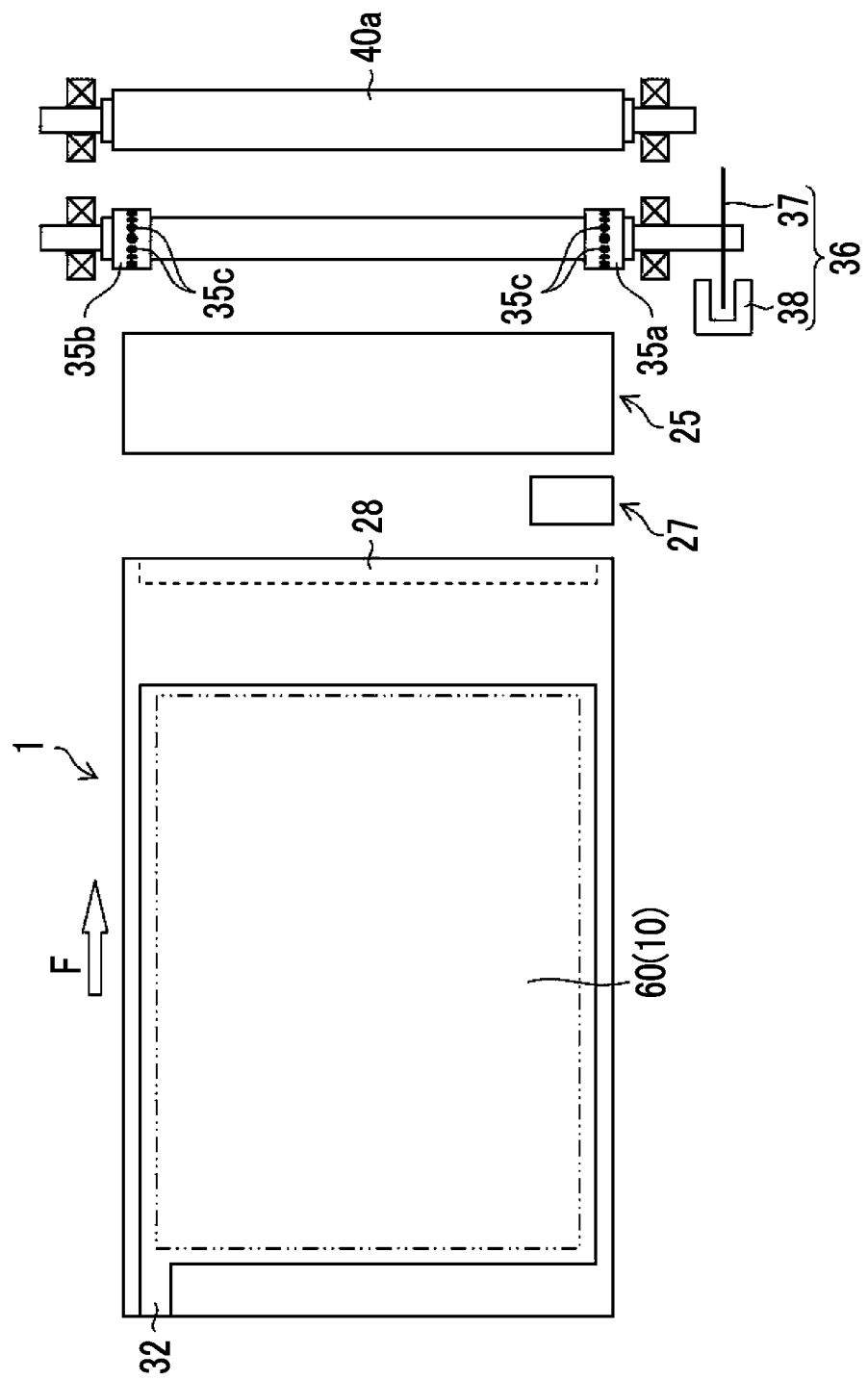
FIG. 7 is a plan view illustrating the transport mechanism for the instant film and the film cover.
Figure 9:
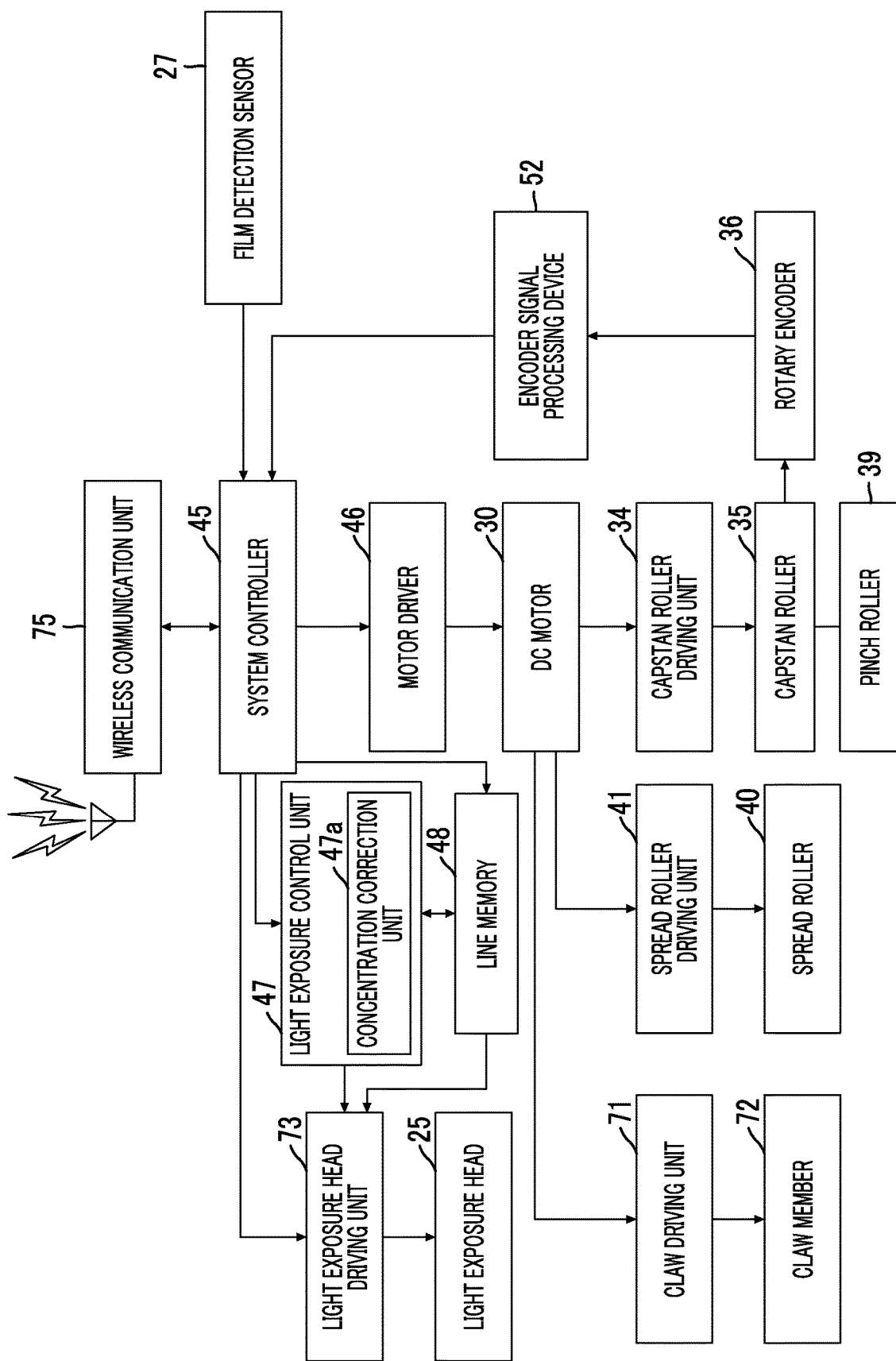
FIG. 9 is a block diagram illustrating an embodiment of the printer according to the embodiment of the present invention.

Next, arrangement of main constituents related to the transport, discharge, and light exposure for the film cover 60 and the instant film 10 in the printer 300 will be described. FIG. 6 is a perspective view illustrating the arrangement of components related to the transport, discharge, and light exposure, and FIG. 7 is a top view in a state illustrated in FIG. 6. In FIG. 6 and FIG. 7, illustrations of components that are not description targets are appropriately omitted, and the shapes, dimensions, and arrangement of components are illustrated in an appropriately simplified manner. In addition, a schematic configuration of a control system of the printer 300 is illustrated in FIG. 9.

As illustrated in FIG. 6 and FIG. 7, on a downstream side of the instant film pack 1 in the transport direction F of the instant film pack 1, a film detection sensor 27, the light exposure head 25 (line head), a capstan roller 35 (transport unit), a pinch roller 39 (transport unit), and the pair of spread rollers 40 (a roller 40a and a roller 40b) (transport unit) are arranged in this order from an upstream side to the downstream side. The position of each unit is fixed.

<Film Detection Sensor>

The film detection sensor 27 is a sensor for detecting the position of the instant film 10. A photointerrupter type or reflection detection type sensor can be used. In a case where the film detection sensor 27 detects the film cover 60 or the instant film 10, a system controller 45 (control unit) starts counting a pulse signal that is detected by an encoder signal processing device 52. The position of the film cover 60 or the instant film 10 can be found using the number of counts of the pulse signal. The position of the film cover 60 or the instant film 10 detected in such a manner is used in control of a light exposure start timing and a transport speed control in a case of passing the instant film 10 to the capstan roller 35 from the claw member 72.

<Light Exposure Head and Light Exposure Head Driving Unit>

The light exposure head 25 is a line type light exposure head and is arranged in a direction in which a longitudinal direction is orthogonal to the transport direction F of the film cover 60 and the instant film 10. An LED array (not illustrated) in which minute light-emitting diodes (LED) that emit red, green, and blue in units of pixels are lined up in the longitudinal direction is disposed inside the light exposure head 25. Light from the LED array of each color is transmitted through a microlens array (not illustrated) that is disposed on a front surface of the LED array, and the same line of the instant film 10 is irradiated with the light. Accordingly, light exposure is performed on the instant film 10 for each line using three colors at the same time, and light exposure corresponding to a line image corresponding to one line is performed by one instance of light exposure performed by the light exposure head 25.

The light exposure head driving unit 73 (refer to FIG. 9; control unit) drives the light exposure head 25 based on the image data received from the smartphone 200. At this point, the light exposure head driving unit 73 controls the light exposure timing and the like of the light exposure head 25 for the line image based on an encoder signal (pulse signal) that is output by the rotary encoder 36 as will be described below.

In the printer 300, by the light exposure head 25 and the light exposure head driving unit 73 having the above configuration, the light exposure surface 10a of the instant film 10 transported by the capstan roller 35 and the pinch roller 39 is irradiated with printing light one line at a time, and the image is printed on the instant film 10. In a case where the printer 300 receives the data of the template from the smartphone 200, the received template is printed on the instant film 10 along with the image.

<Capstan Roller>

The capstan roller 35 is connected to a direct current motor (DC motor) 30 as an electric motor through a power transmission mechanism such as a deceleration gear array (not illustrated) disposed in a capstan roller driving unit 34 (refer to FIG. 9), and rotational driving power of the DC motor 30 is transmitted through the deceleration gear array. In addition, the capstan roller 35 is embedded on the light exposure surface 10a side of the instant film 10. As illustrated in FIG. 7, the capstan roller 35 is arranged in the vicinity of a light emitting unit of the light exposure head 25. A pair of disc shaped rollers 35a and 35b for holding end portions of the film cover 60 and the instant film 10 are arranged in an end portion of the capstan roller 35. The rollers 35a and 35b securely hold the end portion of the instant film 10 using multiple minute protrusions 35c on the surface of the rollers.

<Rotary Encoder>

Figure 8:
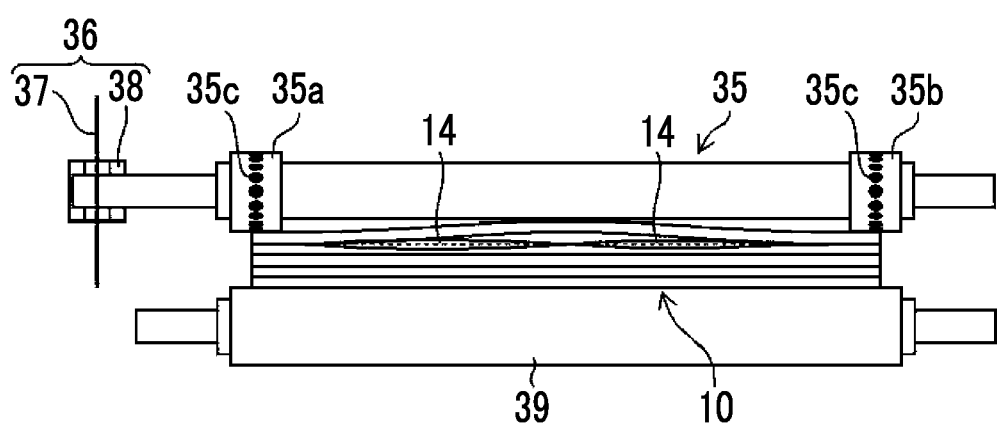
FIG. 8 is a front view of a main part of the transport mechanism for the instant film and the film cover.

In addition, as illustrated in FIG. 6 to FIG. 8, a rotating slit plate (circular plate) 37 that constitutes the optical rotary encoder (encoder) 36 is arranged on the same axis as a rotating shaft of the capstan roller 35. A detection unit 38 that includes a light emitting element consisting of a light emitting diode or the like and a light receiving element such as a photodiode with the rotating slit plate 37 interposed therebetween is fixed.

In the present example, 200 slits 37a (FIG. 6) are formed around the rotating slit plate 37. Each slit 37a has a slit width of 100 μm, and a pitch between slits is 200 μm.

In a case where the rotating slit plate 37 rotates along with rotation of the rotating shaft of the capstan roller 35, each time the slits 37a formed in the rotating slit plate 37 pass between the light emitting element and the light receiving element, light of irradiation from the light emitting element through the rotating slit plate 37 is transmitted through the slits 37a and is incident on the light receiving element, and an electric signal that corresponds to the amount of incident light is output from the light receiving element. Accordingly, an electric signal (an electric signal having a triangular wave shape) that has the same cycle as the cycle of the slits 37*a* passing through the detection unit 38 is output from the detection unit 38 of the rotary encoder 36.

The rotary encoder 36 in the present example includes a comparator that amplifies the triangular wave shaped electric signal output from the detection unit 38 and shapes the waveform of the electric signal into a rectangular wave (pulse signal), and an encoder signal that includes a pulse signal having a cycle corresponding to the rotational speed (the transport speed of the instant film 10) of the rotating slit plate 37 (capstan roller 35) is output.

The encoder signal processing device 52 inputs the encoder signal from the rotary encoder 36, detects the pulse signal (a rise and/or a fall of the pulse signal) included in the encoder signal, and outputs the detected pulse signal to the system controller (control unit) 45. The encoder signal processing device 52 has a function of removing a noise signal included in the encoder signal and generating a lost pulse signal. Details of such a function will be described below.

The system controller 45 controls a printing timing (light exposure timing) of the light exposure head 25 for the line image as will be described below in synchronization with the pulse signal input from the encoder signal processing device 52.

<Pinch Roller>

The pinch roller 39 is formed of an elastic material such as rigid urethane and is arranged to face the capstan roller 35. In addition, the pinch roller 39 is rotationally driven by the capstan roller 35. Coil springs, not illustrated, are connected to both end portions of the pinch roller 39. By biasing of the coil springs, the pinch roller 39 typically abuts the capstan roller 35. By rotating the pinch roller 39 and the capstan roller 35 with the instant film 10 sandwiched therebetween (refer to FIG. 8), the instant film 10 can be transported to the spread rollers 40.

<Spread Roller>

As illustrated in FIG. 6, the spread rollers 40 are arranged to face each other with two spread rollers 40 as one set. The spread rollers 40 is formed of, for example, a metal member and is formed to have the same diameter as the diameter of the capstan roller 35. One roller 40*a* of the one set of spread rollers 40 is arranged on the same side as the capstan roller 35 and is connected to the DC motor 30 through a power transmission mechanism such as a deceleration gear array and a torque limiter, not illustrated, of a spread roller driving unit 41 (refer to FIG. 9), and rotational driving power of the DC motor 30 is transmitted. By embedding the torque limiter, a torque generated in the spread rollers 40 can be regulated in a case where the torque generated in the spread rollers 40 becomes greater than or equal to a set torque. In addition, in the same manner as the pinch roller 39, coil springs (not illustrated) are connected to both ends of the roller 40*b* facing the roller 40*a*. By a biasing force of the coil springs, the roller 40*b* is rotationally driven by the roller 40*a* on the fixed side with the instant film 10 interposed therebetween. The spread rollers 40 break a seal portion of the pod portion 14 by squeezing the pod portion 14 disposed in the instant film 10, causes the developing treatment liquid in the pod portion 14 to flow out from the pod portion 14 by forwarding the instant film 10 with pressure, and uniformly spreads the developing treatment liquid between the photosensitive sheet and the cover sheet (refer to FIG. 8).

<Transport of Film Cover and Instant Film>

In a case where the instant film pack 1 that is not used is loaded into the printer 300, the system controller 45 controls driving of the DC motor 30 (transport unit) through a motor driver 46 in order to automatically transport (discharge) the film cover 60 by detecting the loading of the non-used instant film pack 1. In addition, in a case where the image data and the printing instruction are received from the smartphone 200, the system controller 45 controls driving of the DC motor 30 through the motor driver 46 in order to perform light exposure, developing, and spreading while transporting the instant film 10 that is not subjected to light exposure.

The motor driver 46 is supplied with a direct current power supply from a battery or an alternating current (AC) adapter, not illustrated. The motor driver 46 supplies driving electric power of a predetermined voltage to the DC motor 30 based on a driving instruction that is input from the system controller 45. In the present example, an inexpensive film transport device is implemented such that during the transport of the film cover 60 and the instant film 10, a constant voltage (for example, 5 volts) is applied to the DC motor 30 from the motor driver 46, and a speed control such as speed feedback is not performed.

In addition, the system controller 45 transmits signals to a light exposure control unit 47 and a line memory 48. The rotational driving power of the DC motor 30 is transmitted to a claw driving unit 71 such as a parallel link mechanism or a cam mechanism that causes the claw member 72 to reciprocate, and the rotational driving power causes the claw member 72 to reciprocate. When the claw member 72 reciprocates, the claw member 72 enters from the claw opening portion 32 formed in the instant film pack 1 and is locked at the proximal end of the film cover 60 or the instant film 10 in the uppermost layer (refer to FIG. 10). The distal end of the film cover 60 or the instant film 10 is forwarded in the transport direction F from the discharge port 28. In addition, by driving of the DC motor 30, the capstan roller 35 starts rotating, and the pinch roller 39 is rotationally driven by the rotation of the capstan roller 35.

The film cover 60 or the instant film 10 moves in the transport direction F along with the movement of the claw member 72. In a case where the film cover 60 or the instant film 10 reaches the position of the film detection sensor 27, the film detection sensor 27 detects the film cover 60 or the instant film 10. Accordingly, the system controller 45 starts counting the pulse signal input from the encoder signal processing device 52. Light exposure and transport are controlled based on the number of counts of the pulse signal.

Figure 10:
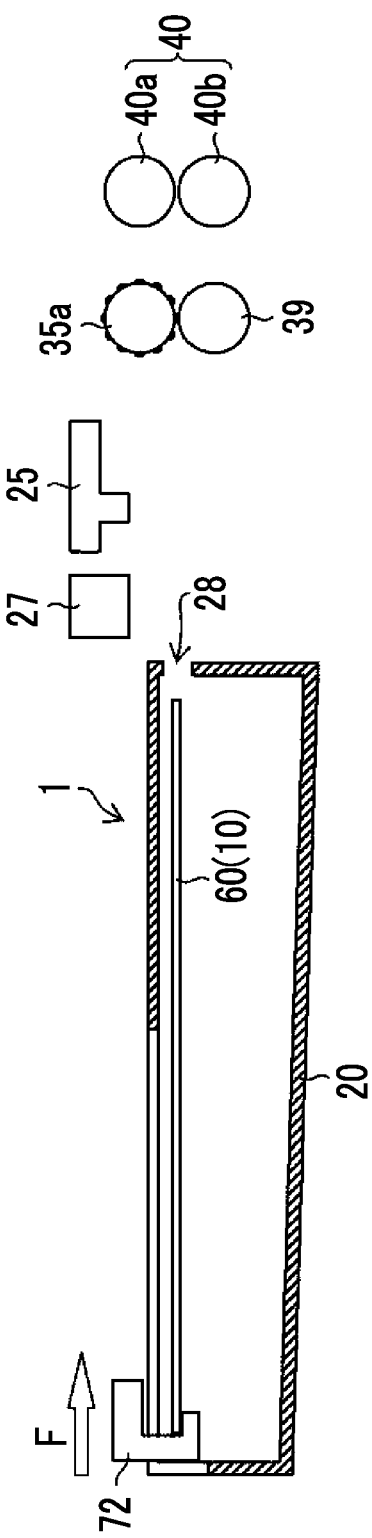
FIG. 10 is a view illustrating a state where the instant film and the film cover are transported.
Figure 11:
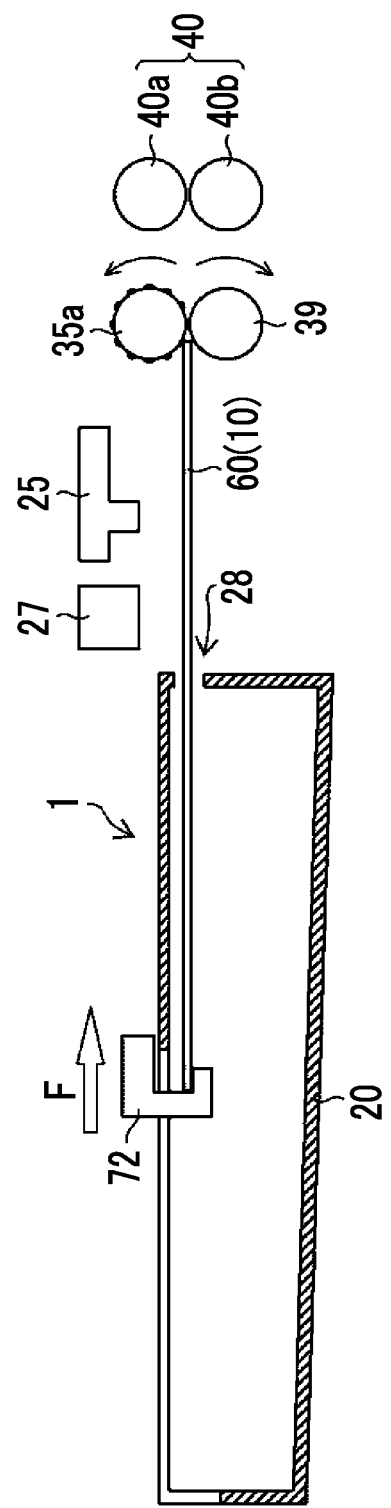
FIG. 11 is another view illustrating a state where the instant film and the film cover are transported.
Figure 12:
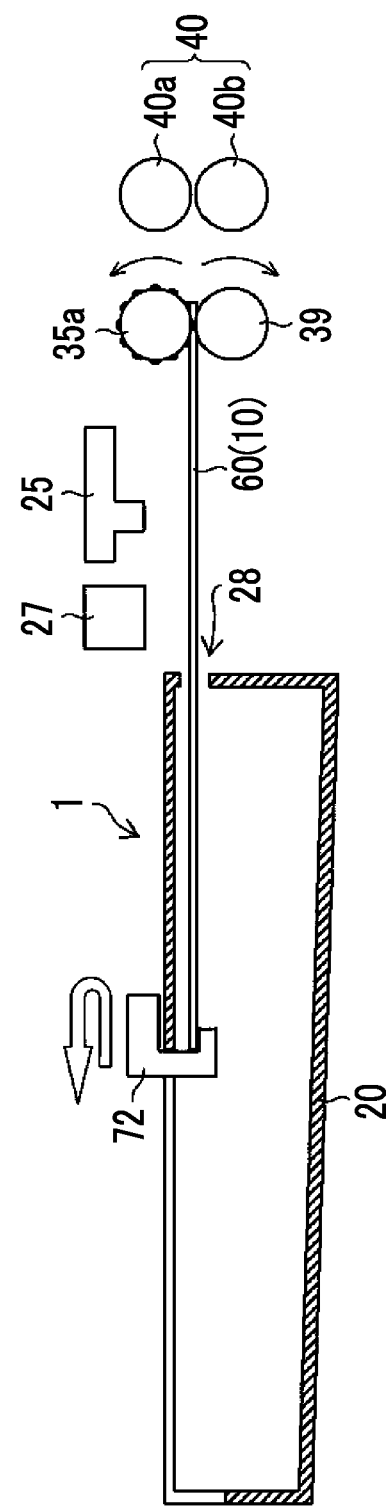
FIG. 12 is still another view illustrating a state where the instant film and the film cover are transported.

The claw member 72 continues moving from the state illustrated in FIG. 10 and forwards the film cover 60 or the instant film 10 between the capstan roller 35 and the pinch roller 39 (refer to FIG. 11). Accordingly, the film cover 60 or the instant film 10 starts entering between the capstan roller 35 and the pinch roller 39, and passing from the claw member 72 to the capstan roller 35 and the pinch roller 39 is started. While the passing is performed, the film cover 60 or the instant film 10 is transported by the capstan roller 35 and the pinch roller 39 in addition to the claw member 72.

In a state where the claw member 72 reaches an end of a movement range by continuing the transport (refer to FIG. 12), the film cover 60 or the instant film 10 is in a state where the film cover 60 or the instant film 10 completely enters between the capstan roller 35 and the pinch roller 39. Accordingly, the passing of the film cover 60 or the instant film 10 is finished, and the claw member 72 starts receding in a direction opposite to the transport direction F. After the passing, the film cover 60 or the instant film 10 is continuously transported by the capstan roller 35 and the pinch roller 39.

In the above transport, the movement range (a distance between a position illustrated in FIG. 10 and a position illustrated in FIG. 12) and the movement speed of the claw member 72 can be set using a gear, a cam member, a link member, or the like (not illustrated) in the claw driving unit 71 in addition to the rotational speed of the DC motor 30. Similarly, the rotational speed of the capstan roller 35 can be set using a gear or the like (not illustrated) in the capstan roller driving unit 34 in addition to the rotational speed of the DC motor 30.

[Encoder Signal Processing Device]

Next, the encoder signal processing device disposed in the printer will be described in detail.

Figure 13:
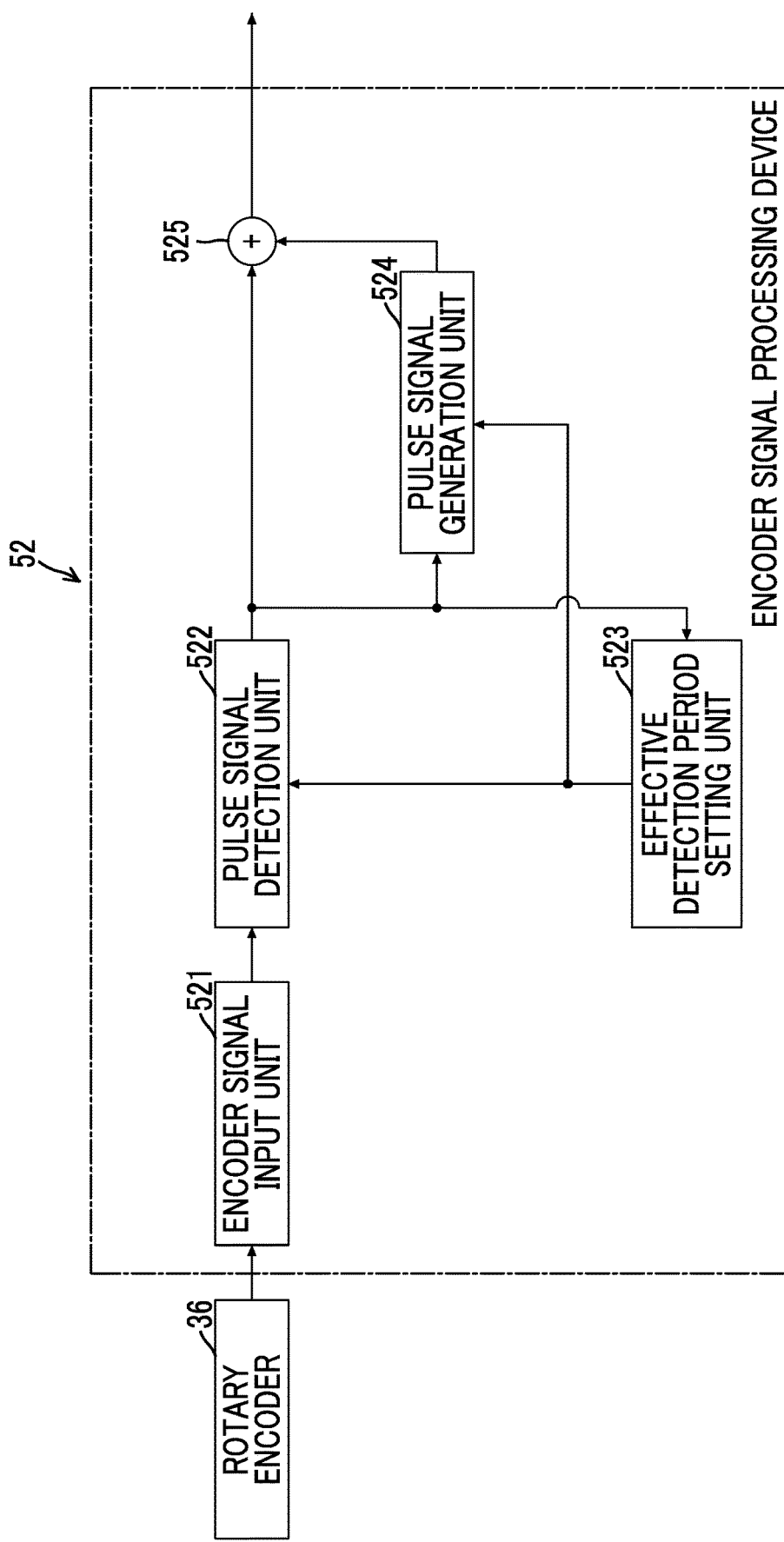
FIG. 13 is a block diagram illustrating a first embodiment of an encoder signal processing device disposed in the printer.

FIG. 13 is a block diagram illustrating a first embodiment of the encoder signal processing device 52 (FIG. 9) disposed in the printer 300.

As illustrated in FIG. 13, the encoder signal processing device 52 is mainly configured with an encoder signal input unit 521, a pulse signal detection unit 522, an effective detection period setting unit 523, a pulse signal generation unit 524, and a pulse signal combining unit 525. The encoder signal processing device 52 may be configured with a digital circuit or may be configured with one or a plurality of central processing units (CPU) in the printer 300, software for processing the encoder signal, and the like.

The rotary encoder 36 outputs the encoder signal that includes the pulse signal having a cycle corresponding to the rotational speed (the transport speed of the instant film 10) of the rotating slit plate 37 (capstan roller 35). As described above, 200 slits 37a (FIG. 6) are formed around the rotating slit plate 37 in the present example. Thus, the rotary encoder 36 generates one pulse signal each time the capstan roller 35 rotates by 1.8 degrees. In addition, the slit width of each slit 37a formed in the rotating slit plate 37 in the present example is 100 μm. Thus, in a case where dust having a size of greater than or equal to 100 μm is attached to the slit 37a, the pulse signal corresponding to the slit 37a to which the dust is attached is lost.

In FIG. 13, the encoder signal is input into the encoder signal input unit 521 from the rotary encoder 36.

Figure 14:
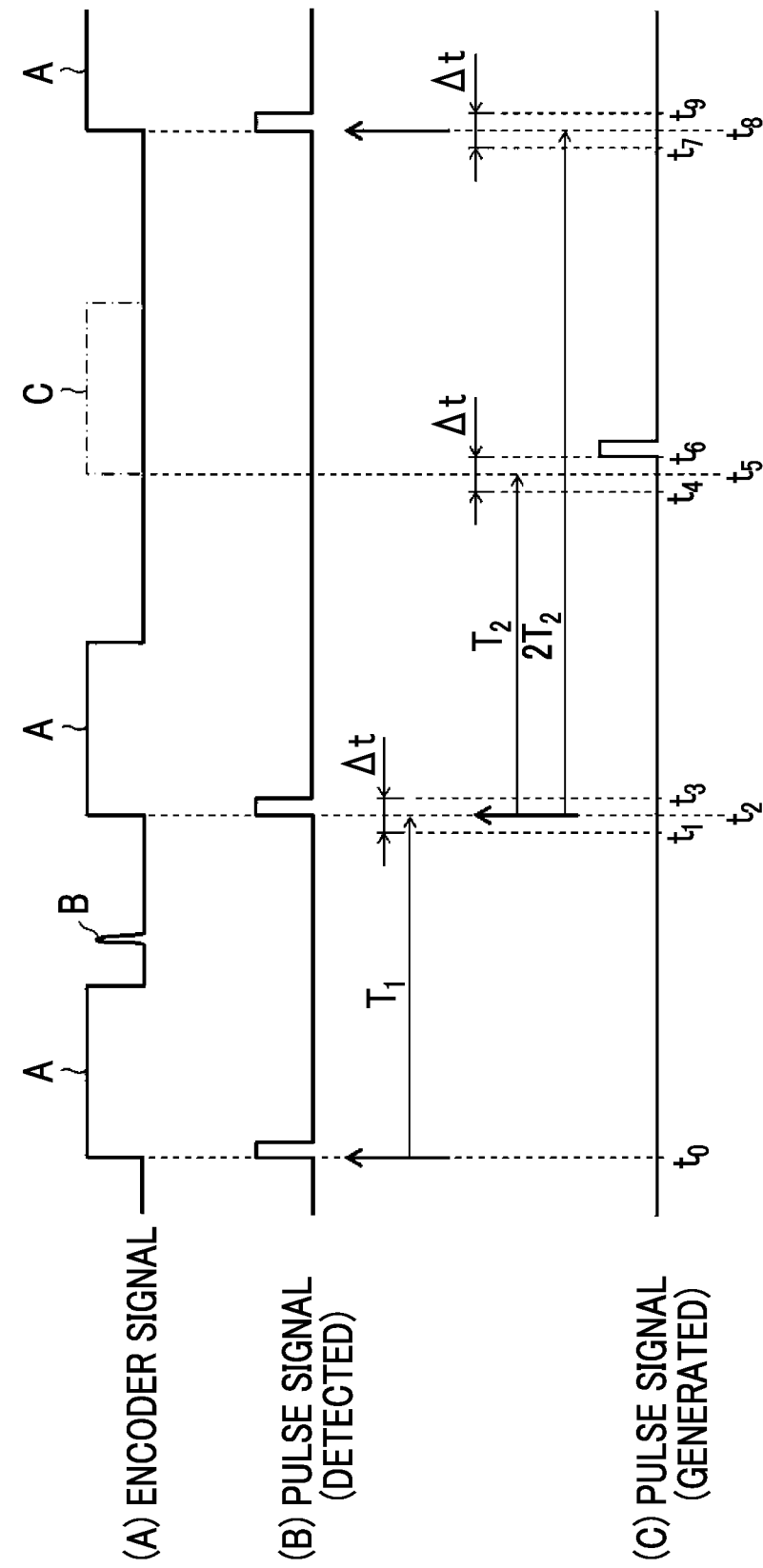
FIG. 14 is a view illustrating a signal waveform of each unit used for describing a processing content of the encoder signal processing device.

FIG. 14 illustrates one example of the waveform of the encoder signal. The encoder signal illustrated in the drawing includes a rectangular pulse signal A that is generated in correspondence with the slits 37a of the rotating slit plate 37, and a noise signal B that is mixed with the encoder signal. In addition, a part C of the encoder signal that is illustrated using a dot-dashed line indicates a position at which the pulse signal that is lost by the dust attached to the slit 37a of the rotating slit plate 37 occurs.

The pulse signal detection unit 522 is a part that detects the pulse signal A from the encoder signal input into the encoder signal input unit 521, and detects the pulse signal A (in the present example, a time immediately before a timing of moment of a rise of the signal included in the encoder signal) only within an effective detection period that is set by the effective detection period setting unit 523.

The effective detection period setting unit 523 sets the effective detection period for detecting the subsequent pulse signal, each time the pulse signal is detected by the pulse signal detection unit 522.

In FIG. 14, in a case where the pulse signal detection unit 522 detects the pulse signal from the encoder signal at time $t_0$, the effective detection period setting unit 523 sets the effective detection period based on time $t_0$ at which the pulse signal is detected, a cycle $T_1$ that is acquired from a plurality of most recent detected pulse signals, and the width of change in the transport speed of the instant film 10.

Figure 15:
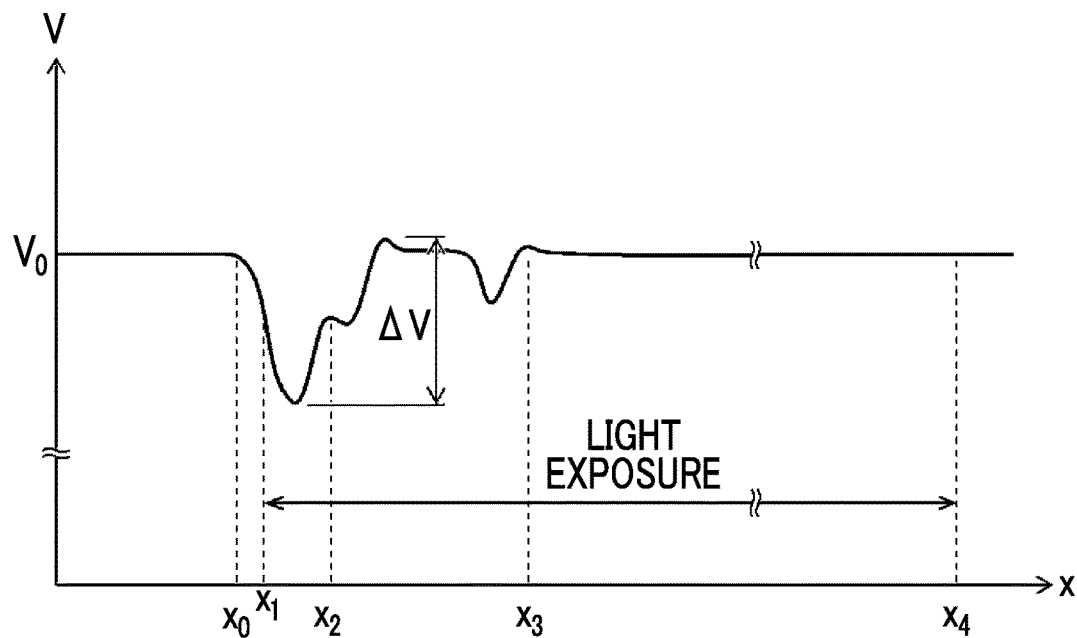
FIG. 15 is a graph illustrating one example of a transport speed of the instant film.

FIG. 15 is a graph illustrating one example of the transport speed of the instant film 10. In FIG. 15, $V_0$, $\Delta V$, and $x_0$ to $x_4$ are as follows.

$V_0$: a reference transport speed of the instant film 10

$\Delta V$: the width of change (maximum width of change) in the transport speed of the instant film 10

$x_0$: the position of instant film 10 at a time immediately before a timing of moment of the distal end of the instant film 10 entering between the capstan roller 35 and the pinch roller 39

$x_1$: the distal end position of the instant film 10 at which light exposure on the instant film 10 is started $x_2$: a position at which the pod portion 14 of the instant film 10 reaches the pair of spread rollers 40

$x_3$: a position at which the pod portion 14 of the instant film 10 passes through the pair of spread rollers 40

$x_4$: the distal end position of the instant film 10 at which light exposure on the instant film 10 is finished As illustrated in FIG. 15, by the constant voltage supplied to the DC motor 30, the instant film 10 is typically transported at the reference transport speed $V_0$ that corresponds to the constant voltage. However, load is exerted when the distal end of the instant film 10 enters between the capstan roller 35 and the pinch roller 39, and when the pod portion 14 of the instant film 10 is squeezed by the pair of spread rollers 40. A transport speed V of the instant film 10 becomes lower than the reference transport speed $V_0$ depending on the load and becomes slightly higher than the reference transport speed $V_0$ when the load is reduced (overshoot).

The cycle of the pulse signal A included in the encoder signal output from the rotary encoder 36 may change depending on the rotational speed (that is, the transport speed V of the instant film 10 transported by the capstan roller 35) of the rotating slit plate 37 (capstan roller 35) of the rotary encoder 36. However, the transport speed V of the instant film 10 does not rapidly change, and the maximum width of change $\Delta V$ in the transport speed V of the instant film 10 is known.

Accordingly, as illustrated in FIG. 14, in a case where the pulse signal detection unit 522 detects the pulse signal from the encoder signal at time $t_0$, the effective detection period setting unit 523 sets a period (effective detection period) $\Delta t$ between time $t_2$ after the cycle $T_1$ from time $t_0$ at which the pulse signal is detected, and time $t_1$ and time $t_3$ before and after time $t_2$. In addition, the width of time period of the effective detection period $\Delta t$ is preferably determined based on the maximum width of change $\Delta V$ in the transport speed V of the instant film 10 and is more preferably the minimum width of time period such that a time immediately before a timing of moment of a rise of the pulse signal A can be detected even in a case where a change in the transport speed V of the instant film 10 is equal to the maximum thereof.

In addition, the effective detection period setting unit 523 acquires the cycle $T_1$ corresponding to the current transport speed V of the instant film 10 from the plurality of most recent pulse signals detected by the pulse signal detection unit 522.

Figure 16:
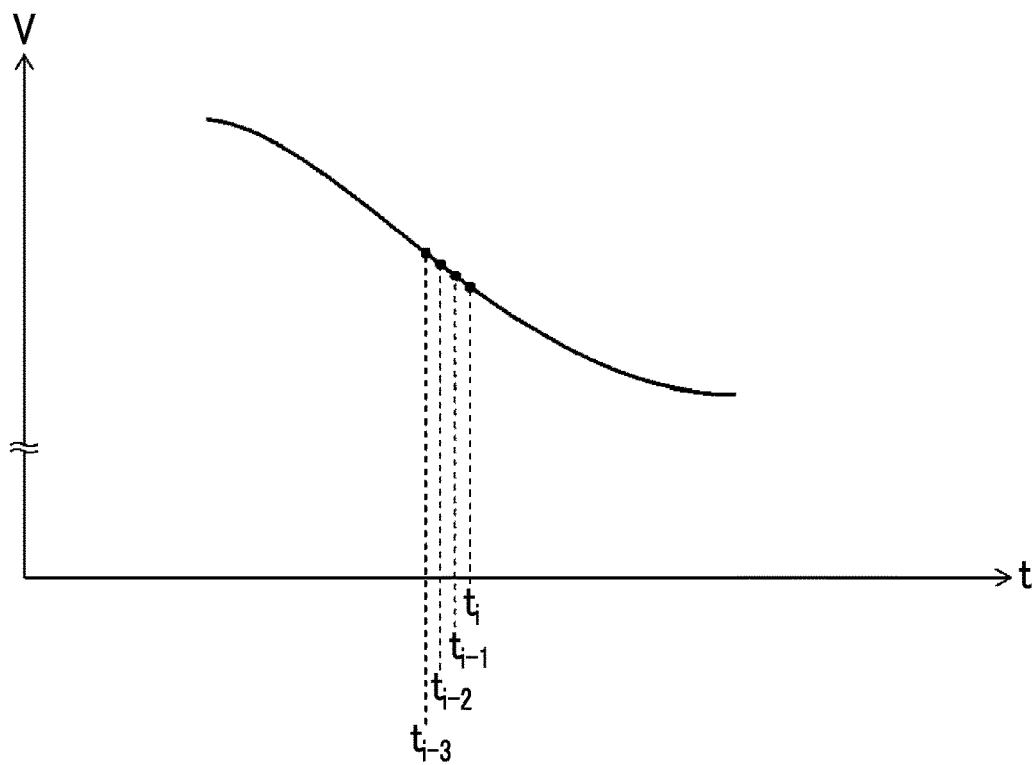
FIG. 16 is a partial enlarged view of a graph corresponding to the transport speed of the instant film illustrated in FIG. 15.

FIG. 16 is a partial enlarged view of a graph corresponding to the transport speed of the instant film 10 illustrated in FIG. 15. In FIG. 15, a vertical axis denotes the transport speed V of the instant film 10, and a horizontal axis denotes a distal end position x of the instant film 10. Meanwhile, in FIG. 16, a vertical axis denotes the transport speed V of the instant film 10, and a horizontal axis denotes time t. In FIG.

16, a black circle on the graph indicates a time immediately before a timing of moment of detecting the pulse signal from the encoder signal.

In FIG. 16, in a case where a time immediately before a timing of moment of detecting the pulse signal corresponding to any light exposure timing for the instant film 10 is denoted by $t_i$, a cycle T of the pulse signal that is used for detecting the subsequent pulse signal is calculated based on a difference in time between each time ($t_{i-3}$, $t_{i-2}$, $t_{i-1}$, and $t_i$) immediately before a timing of moment of detecting a plurality of pulse signals before the light exposure timing (including the pulse signal corresponding to the light exposure timing).

In the example illustrated in FIG. 16, three cycles can be calculated from the time ($t_{i-3}$, $t_{i-2}$, $t_{i-1}$, and $t_i$) immediately before a timing of moment of detecting four pulse signals. Thus, the average of three cycles is used as the cycle T of the pulse signal used for detecting the subsequent pulse signal.

The number of plurality of pulse signals before the light exposure timing is not limited the embodiment. One cycle may be obtained from two pulse signals, or the cycle of the average of two or more cycles acquired from three or more pulse signals may be obtained.

Returning to FIG. 13, as described above, the pulse signal detection unit 522 detects the pulse signal only within the effective detection period set by the effective detection period setting unit 523 from the input encoder signal and detects the subsequent pulse signal only within the effective detection period $\Delta t$ from time $t_1$ to time $t_3$ in a case where the pulse signal (a rise of the encoder signal) is detected at time $t_0$ as illustrated in FIG. 14.

Accordingly, even in a case where the noise signal B is mixed in a period other than the effective detection period $\Delta t$, the noise signal is not erroneously detected as the pulse signal, and the noise signal B can be substantially removed.

In addition, the pulse signal detection unit 522 detects only the initial pulse signal (the initial rise of the encoder signal) within the effective detection period $\Delta t$ set by the effective detection period setting unit 523. Accordingly, even in a case where the noise signal is mixed within the effective detection period $\Delta t$, one pulse signal can be detected. Even in a case where the initial detected pulse signal within the effective detection period is the pulse signal caused by the noise signal, the pulse signal is the pulse signal detected within the effective detection period. Thus, the pulse signal does not cause any problem in a case where the pulse signal is used in a process in a subsequent stage.

As illustrated in FIG. 14, in a case where the pulse signal detection unit 522 detects the pulse signal at time $t_2$, the effective detection period setting unit 523 sets the effective detection period for detecting the subsequent pulse signal using time $t_2$ as a reference.

In the example illustrated in FIG. 14, the effective detection period $\Delta t$ from time $t_4$ to time $t_6$ is set using a cycle $T_2$ of the most recent pulse signal and the width of time period of the effective detection period $\Delta t$. In the effective detection period $\Delta t$, a rise of the encoder signal is not present (a rectangular pulse signal that is to be originally generated in the part C illustrated using a dot-dashed line is lost), and the pulse signal detection unit 522 cannot detect the pulse signal within the effective detection period $\Delta t$ from time $t_4$ to time $t_6$.

The pulse signal generation unit 524 illustrated in FIG. 13 is supplied with the pulse signal (the pulse signal that is in synchronization with a rise of the encoder signal) detected by the pulse signal detection unit 522 and information indicating the effective detection period $\Delta t$ set by the effective detection period setting unit 523. In a case where the pulse signal is not input from the pulse signal detection unit 522 within the effective detection period $\Delta t$, the pulse signal generation unit 524 generates the pulse signal after the effective detection period and outputs the generated pulse signal. In the example illustrated in FIG. 14, the pulse signal generation unit 524 outputs the generated pulse signal immediately after (time $t_6$) the effective detection period $\Delta t$ from time $t_4$ to time $t_6$.

In addition, as described above, in a case where the pulse signal detection unit 522 does not detect the pulse signal within the effective detection period $\Delta t$ from time $t_4$ to time $t_6$, the effective detection period setting unit 523 sets the effective detection period for detecting the subsequent pulse signal using time $t_2$ at which the pulse signal is detected by the pulse signal detection unit 522 as a reference. In this case, the effective detection period $\Delta t$ from time $t_7$ to time $t_9$ is set using the width of time period of the effective detection period $\Delta t$ and a cycle ($2T_2$) that is double the cycle $T_2$.

The pulse signal combining unit 525 combines the pulse signal detected by the pulse signal detection unit 522 and the pulse signal generated by the pulse signal generation unit 524 and outputs the combined pulse signal to the system controller 45.

Accordingly, the encoder signal processing device 52 can remove the effect of the noise signal and can output a favorable pulse signal (the pulse signal having a cycle corresponding to the transport speed of the instant film 10) even in a case where the original pulse signal is lost from the encoder signal by dust attached to the slit 37a of the rotating slit plate 37.

Figure 17:
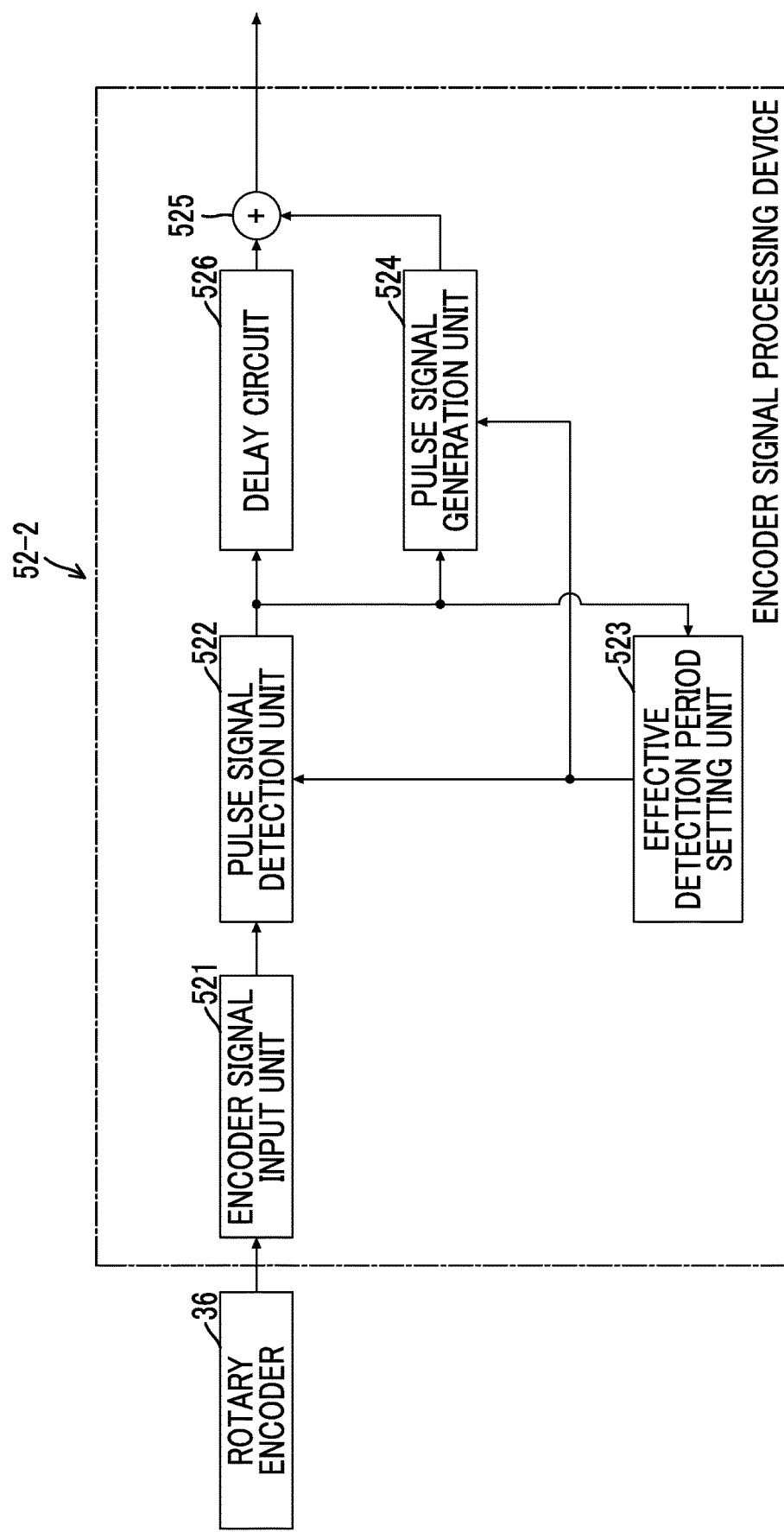
FIG. 17 is a block diagram illustrating a second embodiment of an encoder signal processing device in the printer.

FIG. 17 is a block diagram illustrating a second embodiment of an encoder signal processing device that can be applied to the printer 300. Common parts in the encoder signal processing device 52 of the first embodiment illustrated in FIG. 13 will be designated by the same reference signs, and detailed description of such parts will not be repeated.

An encoder signal processing device 52-2 of the second embodiment illustrated in FIG. 17 is different from the encoder signal processing device 52 of the first embodiment in that a delay circuit 526 is added between the pulse signal detection unit 522 and the pulse signal combining unit 525.

The delay circuit 526 inputs the pulse signal detected by the pulse signal detection unit 522 and outputs the input pulse signal by delaying the input pulse signal by a certain time period. The certain time period of delay made by the delay circuit 526 is preferably a time period that corresponds to the effective detection period set by the effective detection period setting unit 523.

As illustrated in FIG. 14, in a case where the pulse signal detection unit 522 does not detect the pulse signal within the effective detection period, the pulse signal generation unit 524 generates (outputs) the pulse signal immediately after (time $t_6$) the effective detection period.

In a case where the pulse signal is not lost from the encoder signal, and the transport speed of the instant film 10 does not change, the pulse signal is detected at time $t_5$ after the cycle $T_2$ from time $t_2$ at which the previous pulse signal is detected.

Accordingly, compared to the pulse signal that is to be originally detected by the pulse signal detection unit 522, the pulse signal generated (output) by the pulse signal generation unit 524 is output in a delayed manner and, in the example illustrated in FIG. 14, is delayed by a difference of time $t_6$−time $t_5$ and output.

The delay circuit 526 delays the pulse signal output from the pulse signal detection unit 522 by the delay of the pulse signal output from the pulse signal generation unit 524.

Accordingly, in a case where the pulse signal is output from the pulse signal generation unit 524, the cycle of each pulse signal combined by the pulse signal combining unit 525 can be made uniform (the cycle more correctly reflects the transport speed of the instant film 10).

[Light Exposure Control]

As illustrated in FIG. 9, the system controller 45 drives the light exposure head driving unit 73 in synchronization with the pulse signal input from the encoder signal processing device 52, thereby controlling the light exposure timing of the light exposure head 25, and controls the amount of light emission of each color of red, green, and blue emitted from the light exposure head 25 through the light exposure control unit 47 (control unit), the line memory 48, and the light exposure head driving unit 73.

The system controller 45 sequentially supplies image data of red, green, and blue corresponding to one line in the image data received through the wireless communication unit 75 to the line memory 48 and temporarily retains the image data of red, green, and blue corresponding to one line in the line memory 48.

In addition, the system controller 45 functions as a speed detection unit. The system controller 45 obtains the current transport speed of the instant film 10 based on the pulse signal input from the encoder signal processing device 52 and outputs a transport speed signal indicating the obtained transport speed to the light exposure control unit 47.

As described using FIG. 16, the transport speed of the instant film 10 can be obtained using the cycle (the cycle of the average in a case where two or more cycles are acquired) acquired from the plurality of pulse signals before the light exposure timing.

The light exposure control unit 47 includes a density correction unit 47a and outputs a pulse width modulation (PWM) signal to the light exposure head 25 or outputs the PWM signal of which the pulse width is corrected by the density correction unit 47a, such that the amount of light emission emitted from each LED of the light exposure head 25 is set to an amount of light emission corresponding to each pixel value (for example, 0 to 255) of the image data.

That is, the light exposure control unit 47 generates the PWM signal by performing pulse width modulation of each pixel value of the image data based on the image data of red, green, and blue corresponding to one line temporarily retained in the line memory 48.

The density correction unit 47a is a part that corrects the density of the image to be printed on the instant film to the same density as in a case where the instant film 10 is transported at the reference transport speed (the reference transport speed $V_0$ illustrated in FIG. 15), regardless of the transport speed of the instant film 10. The density correction unit 47a corrects the pulse width of the generated PWM signal based on the transport speed signal that indicates the current transport speed of the instant film 10 and is input from the system controller 45.

The correction of the pulse width of the PWM signal performed by the density correction unit 47a is such that the light emission time period of the light exposure head 25 is decreased in a case where the transport speed of the instant film 10 is lower than the reference transport speed $V_0$, and the light emission time period of the light exposure head 25 is increased in a case where the transport speed of the instant film 10 is higher than the reference transport speed $V_0$.

The PWM signal corrected by the density correction unit 47a is output to the light exposure head driving unit 73.

A light exposure timing signal that is in synchronization with the pulse signal of the encoder signal is supplied as another input into the light exposure head driving unit 73 from the system controller 45. The light exposure head driving unit 73 amplifies the PWM signal input from the light exposure control unit 47 and outputs the amplified PWM signal to the light exposure head 25 in synchronization with the light exposure timing signal input from the system controller 45.

The light exposure head 25 causes each LED of the light exposure head 25 to emit light based on the PWM signal supplied from the light exposure head driving unit 73 and performs simultaneous three color light exposure on the light exposure surface 10a of the instant film 10.

Figure 18:
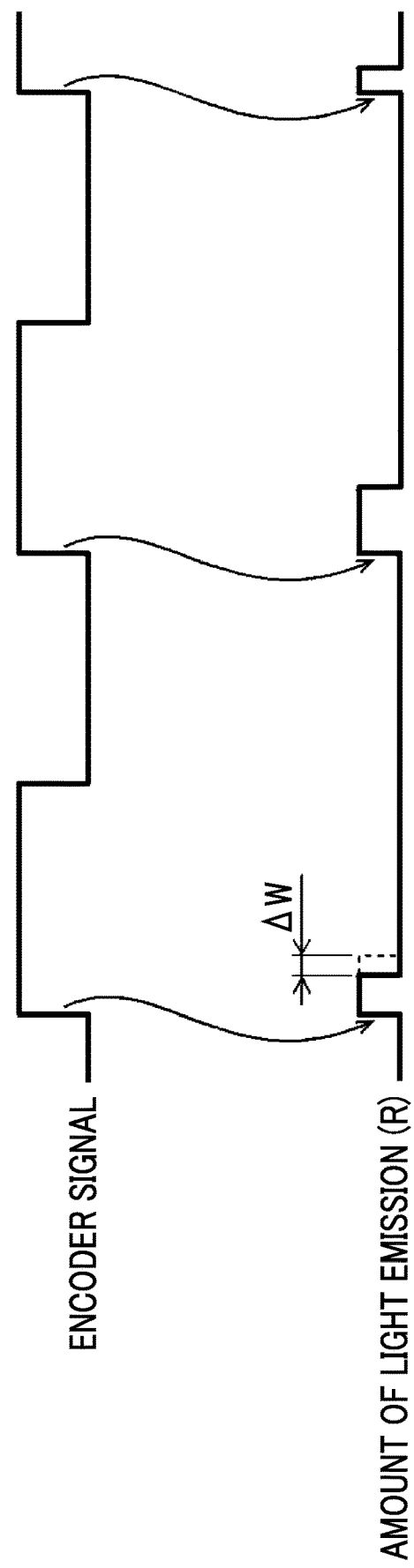
FIG. 18 is a view illustrating correction (density correction) of a light exposure timing and the amount of light emission of a light exposure head that performs light exposure in synchronization with a pulse signal of an encoder signal.

FIG. 18 is a view illustrating correction (density correction) of the light exposure timing and the amount of light emission of the light exposure head 25 that performs light exposure in synchronization with the pulse signal of the encoder signal. The example illustrated in FIG. 18 illustrates the PWM signal that controls light emission of one red (R) LED of the light exposure head 25.

As illustrated in the drawing, the light exposure timing of the light exposure head 25 is controlled in synchronization with the pulse signal (a rise of the pulse signal) of the encoder signal.

In addition, in the example illustrated in FIG. 18, the transport speed V of the instant film 10 becomes lower than the reference transport speed $V_0$. Consequently, correction is performed such that the pulse width is decreased by $\Delta W$ from the pulse width of the PWM signal in a case where the instant film 10 is transported at the reference transport speed $V_0$. That is, correction is performed such that the light emission time period is decreased by $\Delta W$, and the amount of light emission is decreased.

The amount of correction $\Delta W$ of the pulse width corresponds to the amount of change in the speed of the instant film 10 with respect to the reference transport speed $V_0$.

The light exposure timing of light exposure on the instant film 10 performed by the light exposure head 25 for the line image is in synchronization with the pulse signal of the encoder signal. Thus, the number of line images per unit forwarding amount of the instant film 10 is constant regardless of the transport speed V of the instant film 10 and is not affected by the transport speed V of the instant film 10. Accordingly, the transport speed of the instant film 10 does not need to be accurately controlled to a constant speed, and a transport device for the instant film can be implemented using an inexpensive device.

In a case where the transport speed V of the instant film 10 changes, and the transport speed V becomes lower or higher than the reference transport speed $V_0$, unevenness having a shape of streaks occurs in a part where the transport speed V is changed. However, as described above, since the correction (density correction) of the amount of light emission corresponding to the transport speed of the instant film 10 is performed through the density correction unit 47a, unevenness having a shape of streaks can be prevented from occurring in the image (photographic print) printed on the instant film 10.

In the present example, the instant film 10 is an instant film having a positive photosensitizer. For an instant film having a negative photosensitizer, the correction of the amount of light emission is performed in an opposite manner to that for the instant film having a positive photosensitizer. For example, the amount of light emission of the light exposure head 25 is increased as the transport speed of the instant film having a negative photosensitizer is decreased.

In addition, while the amount of light emission of the light exposure head 25 is controlled using the PWM signal (light emission time period) in the present example, the present invention is not limited. The amount of light emission of the light exposure head 25 may be implemented by controlling the light emission intensity of the light exposure head or controlling both the light emission time period and the light emission intensity.

[Printer-Equipped Imaging Apparatus]

Figure 19:
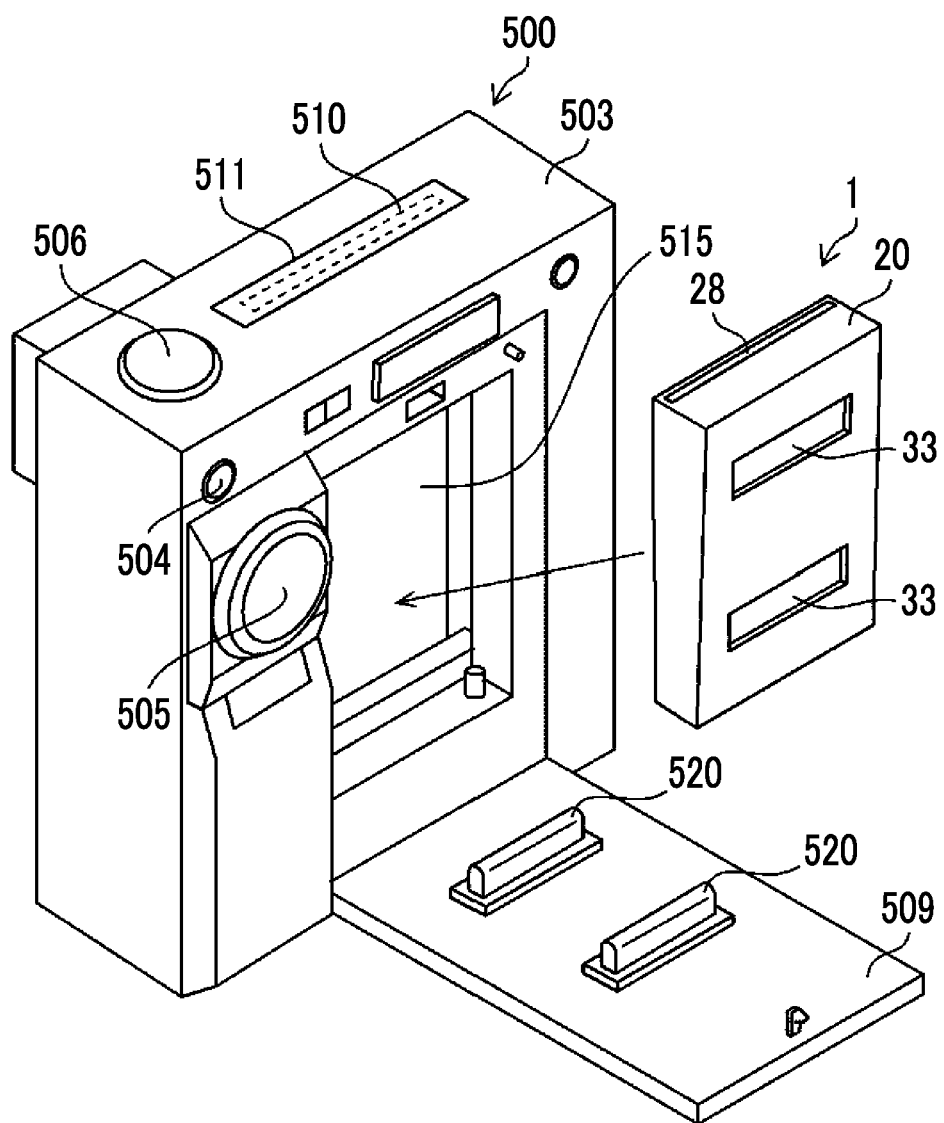
FIG. 19 is a perspective view illustrating a printer-equipped camera.

FIG. 19 is a perspective exterior view of a printer-equipped camera 500 (printer-equipped imaging apparatus) according to a third embodiment seen from a front surface side. In the same manner as the printer 300 (refer to FIG. 2), a loading chamber 515 is disposed in the printer-equipped camera 500, and a film pack is loaded. The loading chamber 515 is closed with an openable and closable lid member 509. The instant film pack 1 that is the same as that of the printer 300 is used as the film pack. In a case where the lid member 509 is closed after the instant film pack 1 is loaded, an uplifting member 520 that is disposed in the lid member 509 is inserted into the uplifting member insertion parts 33 and uplifts the light shielding sheet 50 (refer to FIG. 3) to the front surface side (the opposite side of the uplifting member insertion parts 33 from the opening surface), and the instant film 10 is pressed to the inner surface of the case 20. In the following description, the same configurations as those in the printer 300 will be designated by the same reference signs, and detailed descriptions of such configurations will not be repeated.

<Camera Main Body>

As illustrated in FIG. 19, an objective finder window 504, a capturing lens 505 equipped with a zoom function, a release button 506, a strobe light emitting unit, and a photometric light reception window are exposed on the front surface of the camera main body 503. In addition, the lid member 509 is disposed in a central portion of the camera main body 503. A film discharge port 510 (dotted line in the drawing) is disposed on the upper surface of the camera main body 503 and is typically covered with a discharge port lid 511.

<Configuration of Printer-Equipped Camera>

Figure 20:
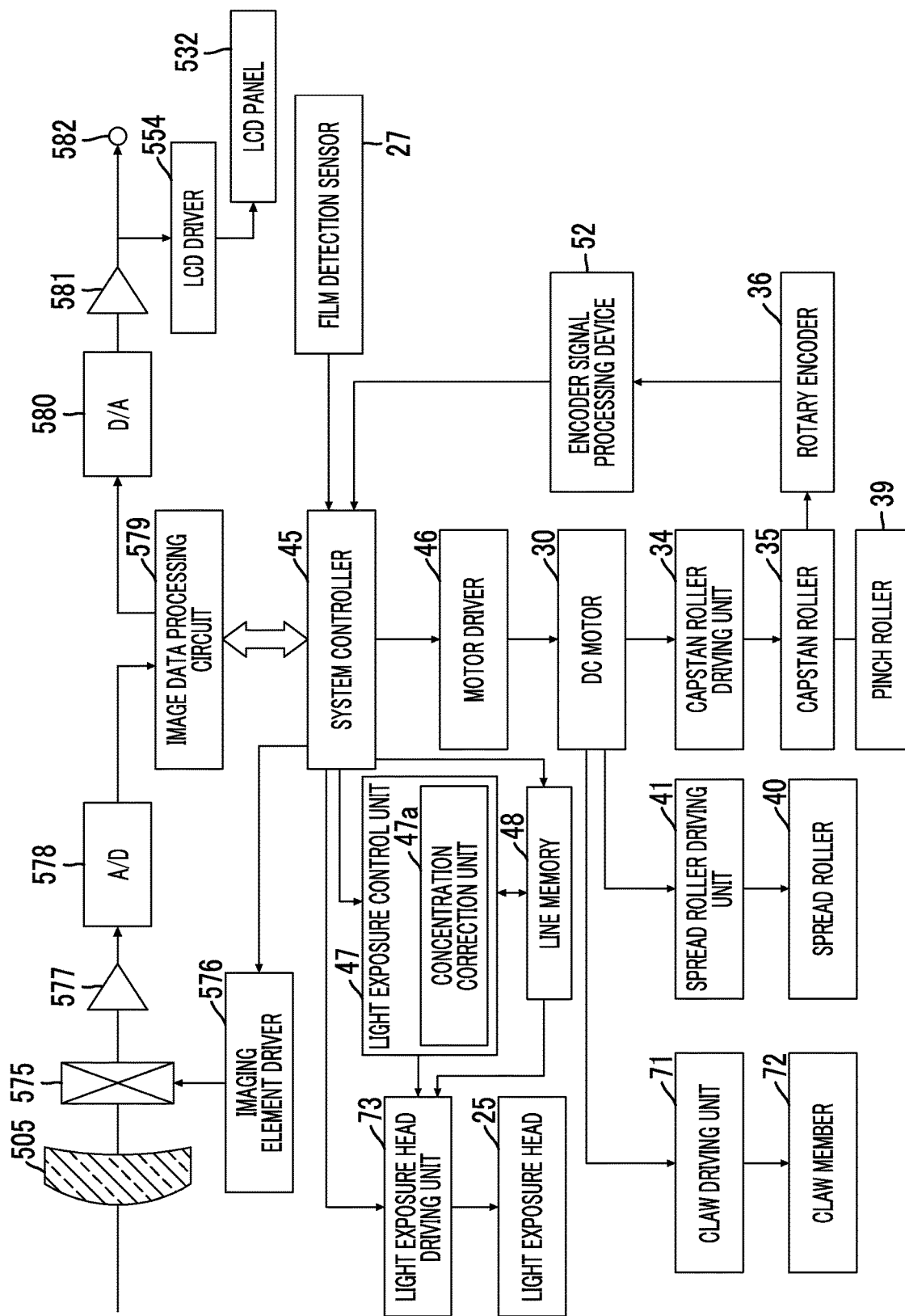
FIG. 20 is a block diagram illustrating a configuration of the printer-equipped camera.

FIG. 20 is a block diagram illustrating a configuration of the printer-equipped camera 500. An imaging element 575 is arranged behind the capturing lens 505. A subject image is formed on a light reception surface of the imaging element 575 by the capturing lens 505. The imaging element 575 is driven by an imaging element driver 576. The imaging element 575 converts the optical subject image into an electric imaging signal and outputs the electric imaging signal. A charge coupled device (CCD) type or a complementary metal-oxide semiconductor (CMOS) type imaging element can be used as the imaging element 575.

Color filters of red, green, and blue are arranged in a matrix form on a photoelectric surface of the imaging element 575. An imaging signal that is output for each color is amplified by an amplifier 577 and then, is subjected to digital conversion by an analog to digital (A/D) converter 578. The A/D converter 578 generates image data by performing digital conversion of the imaging signal and inputs the image data into an image data processing circuit 579. The capturing lens 505, the imaging element 575, the imaging element driver 576, the A/D converter 578, and the image data processing circuit 579 that function as an imaging unit constitute an image data input unit.

The image data processing circuit 579 performs signal processing such as white balance adjustment and gamma correction on the input image data and outputs the image data to a video signal output terminal 582 through a digital to analog (D/A) converter 580 and an amplifier 581, and outputs the image data to an LCD driver 554 and displays a video on an LCD panel 532. In addition, the image data output by the image data processing circuit 579 is printed on the instant film 10 using the light exposure head 25 and the like under control of the system controller 45.

[Printing Control Method]

Figure 21:
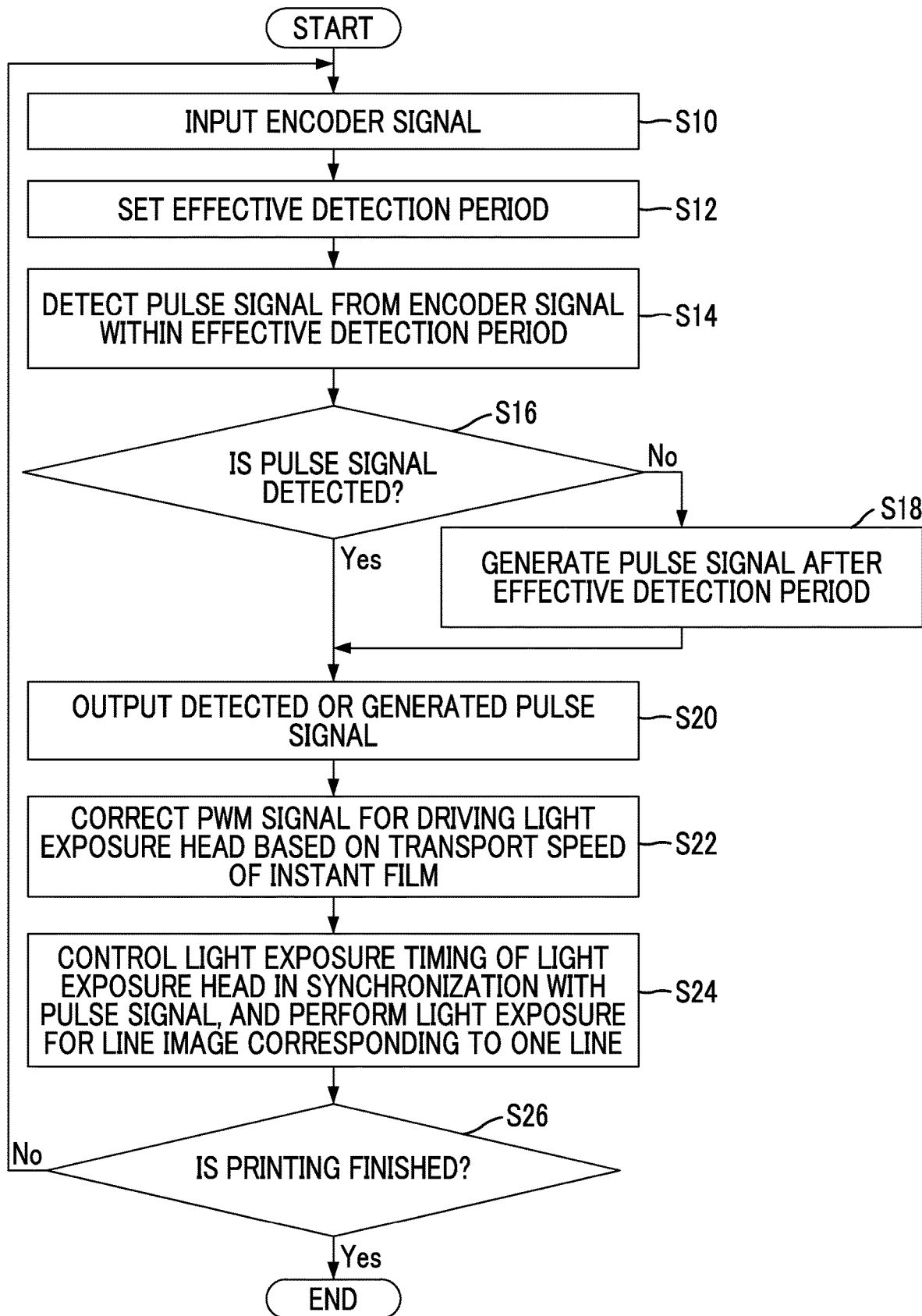
FIG. 21 is a flowchart illustrating a printing control method.

FIG. 21 is a flowchart illustrating a printing control method.

In FIG. 21, the encoder signal processing device 52 of the printer 300 inputs the encoder signal from the rotary encoder 36 (step S10).

In a case where the pulse signal detection unit 522 detects the pulse signal from the encoder signal, the effective detection period setting unit 523 (FIG. 13) of the encoder signal processing device 52 sets the effective detection period Δt for detecting the subsequent pulse signal (step S12). The pulse signal detection unit 522 detects the pulse signal from the encoder signal within the set effective detection period Δt (step S14 and FIG. 14).

The pulse signal generation unit 524 of the encoder signal processing device 52 determines whether or not the pulse signal detection unit 522 detects the pulse signal within the effective detection period (step S16), and generates (outputs) the pulse signal after the effective detection period Δt (step S18 and FIG. 14) in a case where the pulse signal is not detected (in the case of "No").

The pulse signal combining unit 525 of the encoder signal processing device 52 outputs the pulse signal detected by the pulse signal detection unit 522 and the pulse signal generated by the pulse signal generation unit 524 (step S20).

The light exposure control unit 47 generates the PWM signal (the PWM signal corresponding to each pixel value of the image data) for driving the light exposure head 25 based on the image data corresponding to one line. The density correction unit 47a in the light exposure control unit 47 corrects the pulse width of the PWM signal based on the transport speed signal indicating the transport speed of the instant film (step S22). The correction of the pulse width of the PWM signal is such that the light emission time period of the light exposure head 25 is decreased in a case where the transport speed of the instant film is lower than the reference transport speed, and the light emission time period of the light exposure head 25 is increased in a case where the transport speed of the instant film is higher than the reference transport speed.

The light exposure head driving unit 73 amplifies the PWM signal input from the light exposure control unit 47 and outputs the amplified PWM signal to the light exposure head 25 in synchronization with the pulse signal (the light exposure timing signal corresponding to the pulse signal) of the encoder signal. Accordingly, the light exposure timing of the light exposure head 25 is controlled in synchronization with the pulse signal, and light exposure is performed for the line image corresponding to one line (step S24).

Next, the system controller 45 determines whether or not printing on one instant film is finished (step S26). In a case where printing is not finished (in the case of "No"), a return is made to step S10, and the processes from step S10 to step S26 are repeated. In a case where printing is finished (in the case of "Yes"), the present process is finished.

The present invention is not limited to each embodiment described above. It is apparent that the configurations of each embodiment can be appropriately combined, or various modifications can be made without departing from the spirit of the present invention.

EXPLANATION OF REFERENCES

1: instant film pack
10: instant film
10a: light exposure surface
10b: observation surface
12: light exposure portion
14: pod portion
14a: developing treatment liquid pod
16: trap portion
16a: absorbing material
18: observation portion
20: case
22: case main body
22a: front surface part
22c: bottom surface portion
24: case lid
25: light exposure head
26: light exposure opening portion
27: film detection sensor
28: discharge port
29: case flap material
30: DC motor
31: film support unit
32: claw opening portion
32a: entrance portion
32b: passage portion
33: uplifting member insertion part
34: capstan roller driving unit
35: capstan roller
35a, 35b, 40a, 40b: roller
35c: minute protrusion
36: rotary encoder
37: rotating slit plate
37a: slit
38: detection unit
39: pinch roller
40: spread roller
41: spread roller driving unit
42: light shielding sheet attaching unit
45: system controller
46: motor driver
47: light exposure control unit
47a: density correction unit
48: line memory
50: light shielding sheet
52, 52-2: encoder signal processing device
53: first light shielding sheet
53b: fixed portion
54: second light shielding sheet
60: film cover
62: notch portion
64: film cover skirt material
71: claw driving unit
72: claw member
73: light exposure head driving unit
75: wireless communication unit
100: printing system
200: smartphone
300: printer
311: film discharge port
302: lid member
304: uplifting member
315: loading chamber
500: printer-equipped camera
503: camera main body
504: objective finder window
505: capturing lens
506: release button
509: lid member
510: film discharge port
511: lid
515: loading chamber
521: encoder signal input unit
522: pulse signal detection unit
523: effective detection period setting unit
524: pulse signal generation unit
525: pulse signal combining unit
526: delay circuit
532: LCD panel
554: LCD driver
575: imaging element
576: imaging element driver
577: amplifier
578: A/D converter
579: image data processing circuit
580: D/A converter
581: amplifier
582: output terminal
S10 to S26: step
T, $T_1$, $T_2$: cycle
$\Delta V$: width of change
$\Delta W$: amount of correction
$\Delta t$: effective detection period

What is claimed is:

1. A printer comprising:
an image data input unit that inputs image data;
a line type light exposure head that is driven based on the input image data;
a film transport device including a capstan roller and a pinch roller that transport an instant film having a pod portion containing a developing treatment liquid in a direction orthogonal to a longitudinal direction of the light exposure head, a pair of spread rollers that are arranged downstream of the capstan roller and the pinch roller in a transport direction of the instant film and spread the developing treatment liquid of the pod portion by squeezing the pod portion of the instant film and forwarding the instant film with pressure, and a power transmission mechanism that transmits rotational driving power of an electric motor to each of the capstan roller and the spread rollers;
a rotary encoder that outputs an encoder signal including a pulse signal having a cycle corresponding to a rotational speed of the capstan roller;
a pulse signal detection unit that detects the pulse signal from the encoder signal output from the rotary encoder;
a control unit that controls the light exposure head based on the image data input from the image data input unit, includes a speed detection unit detecting a transport speed of the instant film based on the pulse signal detected by the pulse signal detection unit, controls a light exposure timing of the light exposure head for a line image corresponding to the image data in synchronization with the pulse signal detected by the pulse signal detection unit, and sets the number of the line images per unit forwarding length of the instant film to be constant regardless of the transport speed of the instant film;

a density correction unit that corrects an amount of light emission of the light exposure head based on the transport speed of the instant film detected by the speed detection unit and corrects a change in density of the line image caused by a change in the transport speed of the instant film;

an effective detection period setting unit that sets an effective detection period for detecting a subsequent pulse signal each time the pulse signal detection unit detects the pulse signal; and a pulse signal generation unit that generates the pulse signal after the effective detection period in a case where the pulse signal detection unit does not detect the pulse signal within the effective detection period.

2. The printer according to claim 1,
wherein the electric motor is a direct current motor, and
the film transport device supplies a constant voltage to the direct current motor from a direct current power supply.

3. The printer according to claim 1,
wherein the speed detection unit detects the transport speed of the instant film based on a cycle of the pulse signal acquired from a plurality of the pulse signals that are detected by the pulse signal detection unit before the light exposure timing of the light exposure head for the line image.

4. The printer according to claim 2,
wherein the speed detection unit detects the transport speed of the instant film based on a cycle of the pulse signal acquired from a plurality of the pulse signals that are detected by the pulse signal detection unit before the light exposure timing of the light exposure head for the line image.

5. The printer according to claim 3,
wherein the plurality of pulse signals before the light exposure timing are three or more pulse signals, and
the cycle of the pulse signal is a cycle of an average of two or more cycles acquired from the three or more pulse signals.

6. The printer according to claim 4,
wherein the plurality of pulse signals before the light exposure timing are three or more pulse signals, and
the cycle of the pulse signal is a cycle of an average of two or more cycles acquired from the three or more pulse signals.

7. The printer according to claim 1,
wherein based on the transport speed of the instant film detected by the speed detection unit, the density correction unit decreases the amount of light emission emitted from the light exposure head as the transport speed of the instant film is decreased, and increases the amount of light emission emitted from the light exposure head as the transport speed of the instant film is increased.

8. The printer according to claim 2,
wherein based on the transport speed of the instant film detected by the speed detection unit, the density correction unit decreases the amount of light emission emitted from the light exposure head as the transport speed of the instant film is decreased, and increases the amount of light emission emitted from the light exposure head as the transport speed of the instant film is increased.

9. The printer according to claim 3,
wherein based on the transport speed of the instant film detected by the speed detection unit, the density correction unit decreases the amount of light emission emitted from the light exposure head as the transport speed of the instant film is decreased, and increases the amount of light emission emitted from the light exposure head as the transport speed of the instant film is increased.

10. The printer according to claim 4,
wherein based on the transport speed of the instant film detected by the speed detection unit, the density correction unit decreases the amount of light emission emitted from the light exposure head as the transport speed of the instant film is decreased, and increases the amount of light emission emitted from the light exposure head as the transport speed of the instant film is increased.

11. The printer according to claim 5,
wherein based on the transport speed of the instant film detected by the speed detection unit, the density correction unit decreases the amount of light emission emitted from the light exposure head as the transport speed of the instant film is decreased, and increases the amount of light emission emitted from the light exposure head as the transport speed of the instant film is increased.

12. The printer according to claim 6,
wherein based on the transport speed of the instant film detected by the speed detection unit, the density correction unit decreases the amount of light emission emitted from the light exposure head as the transport speed of the instant film is decreased, and increases the amount of light emission emitted from the light exposure head as the transport speed of the instant film is increased.

13. The printer according to claim 1,
wherein the control unit controls the amount of light emission emitted from the light exposure head based on the input image data by performing pulse width modulation of the pulse signal, and
the density correction unit corrects a pulse width of the pulse width modulated pulse signal based on the transport speed of the instant film detected by the speed detection unit.

14. The printer according to claim 1,
wherein the pulse signal detection unit detects the pulse signal from the encoder signal only within the effective detection period, and
the control unit controls the light exposure timing of the light exposure head for the line image in synchronization with the pulse signal detected by the pulse signal detection unit and the pulse signal generated by the pulse signal generation unit.

15. The printer according to claim 1,
wherein the effective detection period setting unit sets the effective detection period based on a cycle of a plurality of the pulse signals detected by the pulse signal detection unit before the light exposure timing of the light exposure head for the line image and a width of change in the transport speed of the instant film.

16. The printer according to claim 1,
wherein the pulse signal generation unit detects only initial one pulse signal within the effective detection period.

17. The printer according to claim 1, further comprising:
a delay circuit that outputs the pulse signal detected by the pulse signal detection unit by delaying the pulse signal by a certain time period.

18. The printer according to claim 17,
wherein the certain time period is a time period that corresponds to the effective detection period.

19. A printer-equipped imaging apparatus comprising:
the printer according to claim 1; and
an imaging unit that functions as the image data input unit.

20. A printing control method for a printer including a line type light exposure head that is driven based on image data, a capstan roller and a pinch roller that transport an instant film having a pod portion containing a developing treatment liquid in a direction orthogonal to a longitudinal direction of the light exposure head, a pair of spread rollers that are arranged downstream of the capstan roller and the pinch roller in a transport direction of the instant film and spread the developing treatment liquid of the pod portion by squeezing the pod portion of the instant film and forwarding the instant film with pressure, a power transmission mechanism that transmits rotational driving power of an electric motor to each of the capstan roller and the spread rollers, a rotary encoder that outputs an encoder signal including a pulse signal having a cycle corresponding to a rotational speed of the capstan roller, a pulse signal detection unit that detects the pulse signal from the encoder signal output from the rotary encoder, and a speed detection unit that detects a transport speed of the instant film based on the pulse signal detected by the pulse signal detection unit, the method comprising:

a step of detecting the pulse signal by the pulse signal detection unit;

a step of detecting the transport speed of the instant film by the speed detection unit;

a step of correcting an amount of light emission of the light exposure head based on the detected transport speed of the instant film and correcting a change in density of the line image caused by a change in the transport speed of the instant film;

a step of controlling a light exposure timing of the light exposure head for the line image corresponding to the image data in synchronization with the detected pulse signal and setting the number of the line images per unit forwarding length of the instant film to be constant regardless of the transport speed of the instant film;

a step of setting an effective detection period for detecting a subsequent pulse signal each time the pulse signal detection unit detects the pulse signal; and a step of generating the pulse signal after the effective detection period in a case where the pulse signal detection unit does not detect the pulse signal within the effective detection period.

* * * * *